(12) United States Patent
Negoro et al.

(10) Patent No.: US 6,770,334 B2
(45) Date of Patent: Aug. 3, 2004

(54) OPTICALLY ANISOTROPIC SHEET COMPRISING ALIGNED DISCOTIC LIQUID CRYSTAL MOLECULES

(75) Inventors: Masayuki Negoro, Kanagawa (JP); Jiro Yamaguchi, Kanagawa (JP); Ken Kawata, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 240 days.

(21) Appl. No.: 09/819,861

(22) Filed: Mar. 29, 2001

(65) Prior Publication Data

US 2002/0063828 A1 May 30, 2002

(30) Foreign Application Priority Data

Mar. 29, 2000 (JP) ........................................ 2000-091888
Jul. 14, 2000 (JP) ........................................ 2000-214582

(51) Int. Cl.[7] ............................................. C09K 19/00
(52) U.S. Cl. ........................................ 428/1.2; 349/123
(58) Field of Search .................... 428/1.1, 1.2; 349/117, 349/118, 120, 122, 123

(56) References Cited

U.S. PATENT DOCUMENTS

| | | |
|---|---|---|
| 5,583,679 A | 12/1996 | Ito et al. |
| 5,646,703 A | 7/1997 | Kamada et al. |
| 5,805,253 A | 9/1998 | Mori et al. |
| 5,855,971 A | 1/1999 | Kobori et al. |
| 5,883,685 A | 3/1999 | Mazaki et al. |
| 5,895,106 A * | 4/1999 | VanderPloeg et al. ...... 349/120 |
| 5,990,997 A * | 11/1999 | Jones et al. .................. 349/120 |
| 6,064,457 A * | 5/2000 | Aminaka ..................... 349/117 |
| 6,081,312 A * | 6/2000 | Aminaka et al. ........... 349/118 |
| 6,124,913 A | 9/2000 | Mazaki et al. |
| 6,184,957 B1 * | 2/2001 | Mori et al. .................. 349/118 |
| 6,380,996 B1 * | 4/2002 | Yokoyama et al. ......... 349/117 |

FOREIGN PATENT DOCUMENTS

| | | |
|---|---|---|
| DE | 39 11 620 A1 | 10/1990 |
| JP | 6-214116 | 8/1994 |
| JP | 10-54982 | 2/1998 |
| JP | 10-054982 A | 2/1998 |

\* cited by examiner

*Primary Examiner*—Mark F. Huff
*Assistant Examiner*—Jennifer R. Sadula
(74) *Attorney, Agent, or Firm*—Burns, Doane, Swecker & Mathis, L.L.P.

(57) ABSTRACT

An optically anisotropic sheet comprises an optically anisotropic layer, an orientation layer and a transparent support in this order. The optically anisotropic layer is formed from discotic liquid crystal molecules. The orientation layer is subjected to rubbing treatment. The discotic liquid crystal molecules are aligned with the orientation layer. An average inclined angle of discotic planes of the discotic liquid crystal molecules is in the range of 50° to 90°. An average direction of optical axes of the discotic liquid crystal molecules is essentially parallel to a rubbing direction of the orientation layer.

6 Claims, 2 Drawing Sheets

OPTICALLY ANISOTROPIC SHEET COMPRISING ALIGNED DISCOTIC LIQUID CRYSTAL MOLECULES

FIELD OF THE INVENTION

The present invention relates to an optically anisotropic sheet comprising aligned discotic liquid crystal molecules, The invention also relates to a polarizing plate comprising an optically anisotropic layer, an orientation layer, a transparent support, a polarizing film and a transparent protective film in this order. The invention further relates to a process for orienting discotic liquid crystal molecules with an orientation layer.

BACKGROUND OF THE INVENTION

A liquid crystal display comprises a liquid crystal cell, a polarizing element and an optical compensatory sheet (phase retarder). In a liquid crystal display of transmission type, two polarizing elements are arranged on both sides of the liquid crystal cell and one or two optical compensatory sheets (phase retarders) are arranged between the liquid crystal cell and the polarizing elements. On the other hand, a liquid crystal display of reflection type comprises a reflection plate, a liquid crystal cell, an optical compensatory sheet and a polarizing element in this order.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecules. Each of the substrates has an orientation layer, which has a function of aligning the rod-like liquid crystal molecules. The alignment of the rod-like liquid crystal molecules is determined according to a display mode of the liquid crystal cell. Various display modes of the liquid crystal cell have been proposed. Examples of the mode for transmission type include TN (Twisted Nematic) mode, IPS (In-Plane Switching) mode. FLC (Ferroelectric Liquid Crystal) mode, OCB (Optically Compensatory Bend) mode, STN (Super Twisted Nematic) mode, VA (vertically Aligned) mode and ECB (Electrically Controlled Birefringence) mode. Examples of the mode for reflection type include TN mode, HAN (Hybrid Aligned Nematic) mode and GH (Guest-Host) mode.

The optical compensatory sheet has functions of removing undesired color from a displayed image and enlarging a viewing angle. As the optical compensatory sheet, a stretched birefringent film has been conventionally used.

Recently, an optical compensatory sheet comprising an optically anisotropic layer on a transparent support has been proposed in place of the stretched birefringent film. The optically anisotropic layer is formed from liquid crystal molecules. Since the liquid crystal molecules have various alignment forms, an optical compensatory sheet obtained by using the liquid crystal molecules has specific optical characteristics that cannot be obtained by the conventional stretched birefringent film.

The optical characteristics of the optical compensatory sheet are determined according to optical characteristics (i.e., display mode) of the liquid crystal cell. Various optical compensatory sheets properly applied for various display modes can be produced by using liquid crystal molecules. As the liquid crystal molecules for optical compensatory sheet, rod-like or discotic liquid crystal molecules are generally used.

Various optical compensatory sheets using discotic liquid crystal molecules according to various display modes have been disclosed. For example, an optical compensatory sheet for TN mode is disclosed in Japanese Patent Provisional Publication No. 6(1994)-214116, U.S. Pat. Nos. 5,583,679, 5,646,703 and German Patent Publication No. 3,911,620A1. An optical compensatory sheet for IPS or FLC mode is disclosed in Japanese Patent Provisional Publication No. 10(1998)-54982, and a sheet for OCB or HAN mode is disclosed in U.S. Pat. No. 5,805,253 and International Patent No. WO96/37804. Further, a compensatory sheet for STN mode is disclosed in Japanese Patent Provisional Publication No. 9(1997)-26572, and one for VA mode is disclosed in Japanese Patent No. 2,866,372.

In the optical compensatory sheet for STN mode disclosed in Japanese Patent Provisional Publication No. 9(1997)-26572, the discotic liquid crystal molecules are aligned at an average inclined angle of 50° to 90° (namely, the liquid crystal molecules are vertically aligned).

SUMMERY OF THE INVENTION

An optically anisotropic sheet comprises discotic liquid crystal molecules aligned at an average inclined angle of 50° to 90°. In the optically anisotropic sheet, an average direction of optical axes (normal lines to the discotic planes) of the molecules is generally perpendicular to a rubbing direction of the orientation layer. The optically anisotropic sheet is practically produced in the form of a roll. It is the easiest way to conduct a rubbing treatment along a longitudinal direction of the rolled sheet. Accordingly, the most easily produced optical compensatory sheet having an optically anisotropic layer in which the discotic liquid crystal molecules are aligned at an average inclined angle of 50° to 90° has an average direction of optical axes perpendicular to the longitudinal direction (i.e., the average direction of optical axes is parallel to the lateral direction).

In a polarizing element having stretched polymer film, the transparent axis is perpendicular to the stretching direction. The polarizing element is also practically produced in the form of a roll. It is the easiest way to stretch the film along the longitudinal direction of the roll. Accordingly, the most easily produced polarizing element has a transparent axis perpendicular to the longitudinal direction (i.e., the transparent axis of that polarizing element is parallel to the lateral direction).

Where the rolled optically anisotropic sheet is laminated with the rolled polarizing element, the optical axes of discotic liquid crystal molecules and the transparent axis of the element are easily so arranged that the optical axes are essentially parallel to the transparent axis.

However, the optical axes and the transparent axis of the element are preferably so arranged in some display modes that the optical axes are essentially perpendicular to the transparent axis.

The discotic liquid crystal molecules must be so aligned that the optical axes of liquid crystal molecules are parallel to the rubbing direction of the orientation layer to arrange the optical axes along the longitudinal direction of the rolled sheet. In the present specification, the words "the optical axes of discotic liquid crystal molecules are parallel to the rubbing direction of the orientation layer" mean that an average direction of lines obtained by projecting the normal lines to the discotic planes of the molecules on the support is parallel to the rubbing direction. A new orientation layer having such function is required to orient the optical axes of the discotic liquid crystal molecules parallel to the rubbing direction. A conventional orientation layer orients the optical axes of the discotic liquid crystal molecules perpendicularly to the rubbing direction.

An object of the present invention is to provide an optically anisotropic sheet in which discotic liquid crystal molecules are so aligned that the optical axes are parallel to the rubbing direction.

Another object of the invention is to provide a polarizing plate in which the optical axes of discotic liquid crystal molecules are easily arranged essentially perpendicularly to the transparent axis of polarizing film.

A further object of the present invention is to align discotic liquid crystal molecules so that the optical axes are parallel to the rubbing direction.

The present invention provides an optically anisotropic sheet comprising an optically anisotropic layer formed from discotic liquid crystal molecules, an orientation layer subjected to rubbing treatment and a transparent support in this order, wherein the discotic liquid crystal molecules are so aligned that an average inclined angle of discotic planes of the discotic liquid crystal molecules is in the range of 50° to 90° and that an average direction of optical axes of the discotic liquid crystal molecules is essentially parallel to a rubbing direction of the orientation layer.

The invention also provides a rolled polarizing plate comprising an optically anisotropic layer formed from discotic liquid crystal molecules, an orientation layer subjected to rubbing treatment, a transparent support, a polarizing film and a transparent protective film in this order, wherein the discotic liquid crystal molecules are so aligned that an average inclined angle of discotic planes of the discotic liquid crystal molecules is in the range of 50° to 90° and that an average direction of optical axes of the discotic liquid crystal molecules is essentially parallel to a rubbing direction of the orientation layer.

The invention further provides a process for orienting discotic liquid crystal molecules, comprising the steps of: coating a solution of a copolymer comprising repeating units represented by the formula (I) and repeating units represented by the formula (II) on a support to form a coated layer; rubbing a surface of the coated layer to form an orientation layer; coating a solution containing discotic liquid crystal molecules on the orientation layer to orient the discotic liquid crystal molecules so that an average inclined angle of discotic planes of the discotic liquid crystal molecules is in the range of 50° to 90° and that an average direction of optical axes of the discotic liquid crystal molecules is essentially parallel to a rubbing direction of the orientation layer:

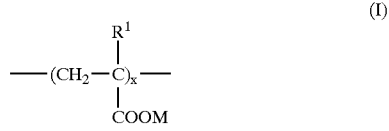

(I)

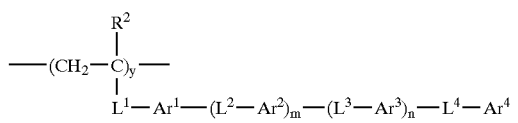

(II)

in which each of $R^1$ and $R^2$ independently is hydrogen, a halogen atom or an alkyl group having 1 to 6 carbon atoms; M is an alkali metal ion; $L^1$ is a divalent linking group selected from the group consisting of —O—, —CO—, —NH—, an alkylene group and a combination thereof; each of $L^2$, $L^3$ and $L^4$ independently is a single bond or a divalent linking group selected from the group consisting of —O—, —CO—, —NH, —SO$_2$—, an alkylene group, an alkenylene group, an alkynylene group and a combination thereof; each of $Ar^1$, $Ar^2$, $Ar^3$ and $Ar^4$ independently is an aromatic ring, which can have a substituent group; each of m and n independently is 0 or 1; x is 10 to 95 mole %; and y is 5 to 90 mole %.

In the present specification, the term "essentially perpendicular" or "essentially parallel" means that the angle between the noticed directions is within the range of 90°±5° or 0°±5°, respectively. The allowance of the angle is preferably less than ±4°, more preferably less than ±3°, further preferably less than ±2°, and most preferably less than ±1°.

The present inventors have succeeded in aligning discotic liquid crystal molecules, whose optical axes are parallel to the rubbing direction. In the prepared optically anisotropic sheet, discotic liquid crystal molecules are so aligned that the optical axes are essentially parallel to the rubbing direction. A rolled optically anisotropic sheet comprising discotic liquid crystal molecules whose optical axes are parallel to the longitudinal direction can be easily produced.

Further, a polarizing element having a transparent axis perpendicular to the longitudinal direction (i.e., along the lateral direction) is most easily produced. Therefore, a polarizing plate in which the optical axes of discotic liquid crystal molecules are essentially perpendicular to the transparent axis of the polarizing film can be easily produced by simply laminating the rolled optically anisotropic sheet and the rolled polarizing element of the invention with their rolled forms maintained.

According to the invention, it is easy to arrange the optical axes of discotic liquid crystal molecules essentially perpendicularly to the transparent axis of the polarizing film.

DETAILED DESCRIPTION OF THE INVENTION

Figure 1:
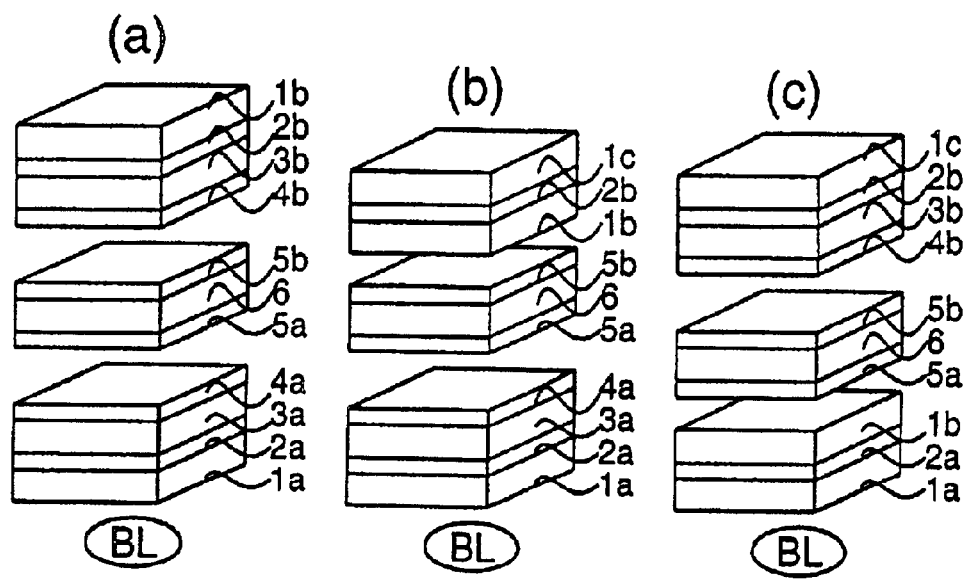
FIG. 1 schematically illustrates basic structures of liquid crystal displays of transmission type.

FIG. 1 schematically illustrates basic structures of liquid crystal displays of transmission type.

The liquid crystal display shown in FIG. 1(a) comprises a backlight (BL), a transparent protective film (1a), a polarizing film (2a), a transparent support (3a), an optically anisotropic layer (4a), a lower substrate of liquid crystal cell (5a), a layer of rod-like liquid crystal molecules (6), an upper substrate of liquid crystal cell (5b), an optically anisotropic layer (4b), a transparent support (3b), a polarizing film (2b) and a transparent protective film (1b) in this order.

Each combination of the transparent support and the optically anisotropic layer (each of 3a–4a and 4b–3b) constitutes an optically anisotropic sheet. Each combination of the transparent protective film, the polarizing film, the transparent support and the optically anisotropic layer (each of 1a to 4a and 4b to 1b) constitutes a polarizing plate.

The transparent supports (3a, 3b) have orientation layers on the side facing the optically anisotropic layers (4a, 4b), and the lower and upper substrates of liquid crystal cell (5a, 5b) also have orientation layers on the side facing the layer of rod-like liquid crystal molecules (6).

The liquid crystal display shown in FIG. 1(b) comprises a backlight (BL), a transparent protective film (1a), a polarizing film (2a), a transparent support (3a), an optically anisotropic layer (4a), a lower substrate of liquid crystal cell (5a), a layer of rod-like liquid crystal molecules (6), an upper substrate of liquid crystal cell (5b), a transparent protective film (1b), a polarizing film (2b) and a transparent protective film (1c) in this order.

The combination of the transparent support and the optically anisotropic layer (3a–4a) constitutes an optically anisotropic sheet. The combination of the transparent protective film, the polarizing film, the transparent support and the optically anisotropic layer (1a to 4a) constitutes a polarizing plate.

The transparent support (3a) has an orientation layer on the side facing the optically anisotropic layer (4a), and the lower and upper substrates of liquid crystal cell (5a, 5b) also have orientation layers on the side facing the layer of rod-like liquid crystal molecules (6).

The liquid crystal display shown in FIG. 1(c) comprises a backlight (BL), a transparent protective film (1a), a polarizing film (2a), a transparent protective film (1b), a lower substrate of liquid crystal cell (5a), a layer of rod-like liquid crystal molecules (6), an upper substrate of liquid crystal cell (5b), an optically anisotropic layer (4b), a transparent support (3b), a polarizing film (2b) and a transparent protective film (1c) in this order.

The combination of the transparent support and the optically anisotropic layer (4b–3b) constitutes an optically anisotropic sheet. The combination of the transparent protective film, the polarizing film, the transparent support and the optically anisotropic layer (4b to 1c) constitutes a polarizing plate.

The transparent support (3b) has an orientation layer on the side facing the optically anisotropic layer (4b), and the lower and upper substrates of liquid crystal cell (5a, 5b) also have orientation layers on the side facing the layer of rod-like liquid crystal molecules (6).

Figure 2:
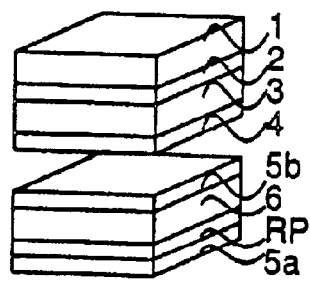
FIG. 2 schematically illustrates a basic structure of a liquid crystal display of reflection type.

FIG. 2 schematically illustrates a basic structure of a liquid crystal display of reflection type.

The liquid crystal display shown in FIG. 2 comprises a lower substrate of liquid crystal cell (5a), a reflection plate (RP), a layer of rod-like liquid crystal molecules (6), an upper substrate of liquid crystal cell (5b), an optically anisotropic layer (4), a transparent support (3), a polarizing film (2) and a transparent protective film (1) in this order.

The combination of the transparent support and the optically anisotropic layer (4–3) constitutes an optically anisotropic sheet. The combination of the transparent protective film, the polarizing film, the transparent support and the optically anisotropic layer (4 to 1) constitutes a polarizing plate.

The transparent support (3) has an orientation layer on the side facing the optically anisotropic layer (4). The reflection plate (RP) and the upper substrate of liquid crystal cell (5b) also have orientation layers on the side facing the layer of rod-like liquid crystal molecules (6).

Figure 3:
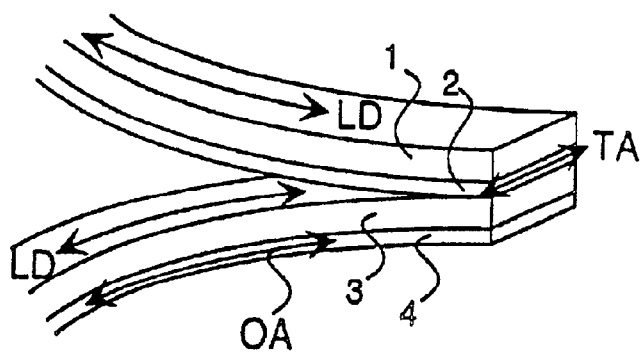
FIG. 3 schematically illustrates the step for laminating a rolled optically anisotropic sheet and a rolled polarizing element.

FIG. 3 schematically illustrates the step for laminating a rolled optically anisotropic sheet and a rolled polarizing element.

As shown in FIG. 3, the rolled polarizing element comprises a transparent protective film (1) and a polarizing film (2). The rolled optically anisotropic sheet comprises a transparent support (3) and an optically anisotropic layer (4), and the transparent support (3) has an orientation layer on the side facing the optically anisotropic layer (4).

The transparent axis (TA) of the polarizing film (2) is essentially perpendicular to the longitudinal direction (LD) of the rolled polarizing element. The optical axes (OA) of discotic liquid crystal molecules in the optically anisotropic layer (4) are essentially parallel to the longitudinal direction (LD) of the rolled optically anisotropic sheet. Consequently, the transparent axis (TA) of the polarizing film (2) is easily arranged essentially perpendicularly to the optical axes (OA) of discotic liquid crystal molecules in the optically anisotropic layer (4) by simply laminating the rolled optically anisotropic sheet and the rolled polarizing element as shown in FIG. 3.

In FIGS. 1 to 3, the transparent support (3) and the optically anisotropic layer (4) may be placed in reverse order.

Figure 4:
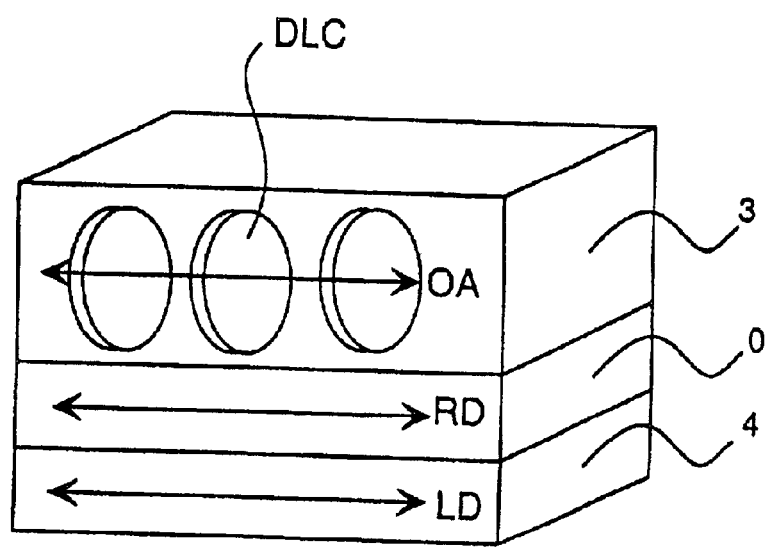
FIG. 4 schematically illustrates alignment of discotic liquid crystal molecules in the optically anisotropic sheet.

FIG. 4 schematically illustrates alignment of discotic liquid crystal molecules in the optically anisotropic sheet.

The optically anisotropic sheet shown in FIG. 4 comprises an oblong transparent support (3), an orientation layer (O) subjected to rubbing treatment and an optically anisotropic layer (4) formed from discotic liquid crystal molecules. The longitudinal direction (LD) of the support (3) is parallel to the rubbing direction (RD) of the orientation layer (O). The optical axes (OA) of discotic liquid crystal molecules (DLC) are also parallel to the longitudinal direction (LD) of the support (3) and the rubbing direction (RD) of the orientation layer (O).

[Support]

The support is preferably transparent. A glass plate or a polymer film (preferably, a polymer film) can be used as the transparent support of the optically anisotropic sheet. The term "transparent" means that light transmittance is not less than 80%.

An optically isotropic polymer film is generally used as the transparent support. The retardation in plane (Re) of the support is preferably less than 20 nm, more preferably less than 10 nm, and most preferably less than 5 nm. The retardation along a thickness direction (Rth) of the film is also preferably less than 100 nm, more preferably less than 50 nm, further preferably less than 30 nm, furthermore preferably less than 10 nm, and most preferably less than 5 nm. The Re and Rth retardation values are defined by the following formula:

$$Re = (nx - ny) \times d$$

$$Rth = [\{(nx+ny)/2\} - nz] \times d$$

in which each of nx and ny is a refractive index in plane of the support; nz is a refractive index along the thickness direction of the support; and d is a thickness of the support.

According to the display mode of the liquid crystal cell, an optically anisotropic polymer film may be used as the transparent support. In that case, the optical anisotropy of the liquid crystal cell is compensated with a combination of the optically anisotropic layer and the optically anisotropic support, which is preferably optically uniaxial or biaxial. If the support is optically uniaxial, it may be either optically positive (i.e., the refractive index along the optical axis is larger than that perpendicular to the optical axis) or optically negative (i.e., the refractive index along the optical axis is smaller than that perpendicular to the optical axis). In an optically biaxial support, the refractive indexes of nx, ny and nz have different values.

The retardation in plane (Re) of the optically anisotropic transparent support is in the range of preferably 0 to 300 nm, more preferably 0 to 200 nm, and most preferably 0 to 100 nm. The retardation along the thickness direction (Rth) of the support is in the range of preferably 10 to 1,000 nm, more preferably 50 to 400 nm, and most preferably 100 to 300 nm.

The material of the support is determined according to whether it is optically isotropic or anisotropic An optically isotropic transparent support is generally made of glass or cellulose esters, while an optically anisotropic support is made of synthetic polymers (e.g., polycarbonate, polysulfone, polyethersulfone, polyacrylate, polymethacrylate and norbornene resin). Further, a cellulose ester film having high retardation (i.e., an optically anisotropic cellulose ester film) can be obtained by the method described in European Patent No. 0911656 A2, in which the optically anisotropic cellulose ester film is prepared (1) with a retardation increasing agent (birefringence increasing agent), (2) by lowering the acetylation degree in the cellulose acetate film, or (3) through the cold dissolution process.

The transparent support of polymer film is preferably prepared according to a solvent casting method.

The polymer film is preferably stretched to prepare an optically anisotropic transparent support.

An optically uniaxial support can be obtained by normal uniaxial or biaxial stretching process.

An optically biaxial support is preferably produced by unbalance biaxial stretching process, in which the polymer film is stretched parallel to a certain direction to a predetermined extent (for example 3 to 100%, preferably S to 30%) and stretched perpendicularly to more extent (for example 6 to 200%, preferably 10 to 90%). The film may be stretched in the two directions at the same time.

It is preferred that the stretching direction (direction in which the film is stretched to the larger extent in unbalance biaxial stretching process) be essentially parallel to the slow axis in plane of the resulting film. The angle between them is preferably less than 10°, more preferably less than 5°, and most preferably less than 3°.

If the transparent support is optically uniaxial or biaxial, it is preferred that an average direction of lines obtained by projecting onto the support the optical axes of discotic liquid crystal molecules in the optically isotropic layer be essentially parallel or perpendicular to the slow axis in plane of the support.

The transparent support has a thickness preferably in the range of 10 to 500 μm, and more preferably in the range of 50 to 200 μm.

The transparent support can be subjected to a surface treatment (e.g., glow discharge treatment, corona discharge treatment, ultraviolet (UV) treatment, flame treatment) to improve adhesion to a layer formed on the support (e.g., adhesive layer, orientation layer, optically anisotropic layer). An ultraviolet (UV) absorbing agent can be incorporated in the support.

An adhesive layer (undercoating layer) can be provided on the transparent support. Japanese Patent Provisional Publication No. 7(1995)-333433 describes an adhesive layer. The adhesive layer has a thickness of preferably 0.1 to 2 μm, and more preferably 0.2 to 1 μm.

[Orientation Layer]

The orientation layer is preferably made of a copolymer comprising repeating units represented by the formula (I) and repeating units represented by the formula (II).

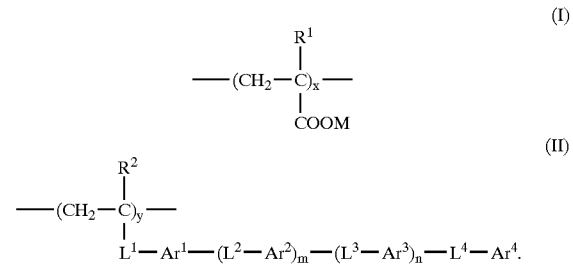

In the formula (I), $R^1$ is hydrogen, a halogen atom or an alkyl group having 1 to 6 carbon atoms. $R^1$ is preferably hydrogen or an alkyl group having 1 to 6 carbon atoms, more preferably is hydrogen, methyl or ethyl, and most preferably is hydrogen or methyl. In the case that $R^1$ is hydrogen, the copolymer is acrylic copolymer. In the case that $R^1$ is methyl, the copolymer is methacrylic copolymer.

In the formula (I), M is an alkali metal ion (lithium ion, sodium ion, potassium ion, cesium ion).

Since the group of COOM is hydrophilic, the copolymer is soluble in water. Accordingly, the orientation layer can be formed by using an aqueous medium.

In the formula (I), x is 10 to 95 mole %, and preferably is 25 to 90 mole %.

In the formula (II), $R^2$ is hydrogen, a halogen atom or an alkyl group having 1 to 6 carbon atoms. $R^2$ preferably is hydrogen or an alkyl group having 1 to 6 carbon atoms, more preferably is hydrogen, methyl or ethyl, and most preferably is hydrogen or methyl.

In the formula (II), $L^1$ is a divalent linking group selected from the group consisting of —O—, —CO—, —NH—, an alkylene group and a combination thereof. $L^1$ preferably is —CO—O—, —CO—NH—, —CO—O-alkylene-, —CO—O-alkylene-O— or —CO—O-alkylene-CO—O—, more preferably is —CO—O— or —CO—NH—.

The alkylene group can have a branched or cyclic structure. The alkylene group contains preferably 1 to 30 carbon atoms, more preferably 1 to 15 carbon atoms, and most preferably 1 to 12 carbon atoms.

In the formula (II), each of $L^2$, $L^3$ and $L^4$ is independently a single bond or a divalent linking group selected from the group consisting of —O—, —CO—, —NH—, —SO$_2$—, an alkylene group, an alkenylene group, an alkynylene group and a combination thereof. At least one of $L^2$, $L^3$ and $L^4$ preferably is a single bond or an alkynylene group, more preferably is a single bond or ethynylene (—C≡C—), and most preferably is ethynylene (—C≡C—). It is preferred that each of $L^2$, $L^3$ and $L^4$ independently is a single bond, ethynylene, —CO—, —O—CO—, —CO—O—, -alkylene-O—, —CO—NH—, —O—CO—O—, —NH—SO$_2$— or —NH—CO—O—.

The alkylene group, the alkenylene group and the alkynylene group can have branched or cyclic structures. The alkylene group contains preferably 1 to 30 carbon atoms, more preferably 1 to 15 carbon atoms, and most preferably 1 to 12 carbon atoms. Each of the alkenylene group and the alkynylene group contains preferably 2 to 30 carbon atoms, more preferably 2 to 15 carbon atoms, and most preferably 2 to 12 carbon atoms.

In the formula (II), each of $Ar^1$, $Ar^2$, $Ar^3$ and $Ar^4$ independently is an aromatic ring (including an aromatic heterocyclic ring) which can have a substituent group.

The aromatic ring preferably is a hydrocarbon aromatic ring having 6 to 18 carbon atoms. Examples of the hydrocarbon aromatic rings include benzene ring, naphthalene ring, anthracene ring, phenanthrene ring, pyrene ring and naphthacene ring. Each of $Ar^1$, $Ar^2$, $Ar^3$ and $Ar^4$ more preferably is benzene ring or naphthalene ring, and most preferably is benzene ring.

Examples of the substituent groups of the aromatic rings include a halogen atom, carboxyl, cyano, nitro, carlbamoyl, sulfamoyl, an alkyl group, an alkoxy group, an alkylthio group, an acyl group, an acyloxy group, an alkylcarbamoyl group, an alkylsulfamoyl group, an amido group, a sulfonamido group and an alkylsulfonyl group.

The alkyl group can have a branched or cyclic structure. The alkyl group contains preferably 1 to 20 carbon atoms, more preferably 1 to 15 carbon atoms, further preferably 1 to 10 carbon atoms, and most preferably 1 to 6 carbon atoms.

In the formula (II), each of m and n is 0 or 1. It is preferred that m be 0 or 1 and n be 0 (two or three aromatic rings). It is more preferred that each of m and n be 0 (two aromatic rings).

In the formula (II), y is 5 to 90 mole %, preferably is 10 to 75 mole %.

Examples of the repeating units represented by the formula (II) (except that $L^2$, $L^3$ or $L^4$ is —C≡C—) are shown below.

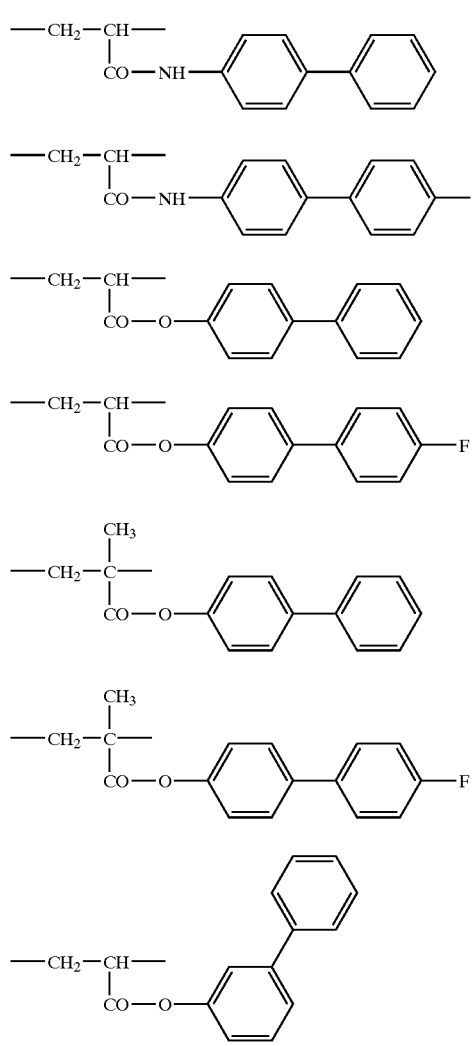

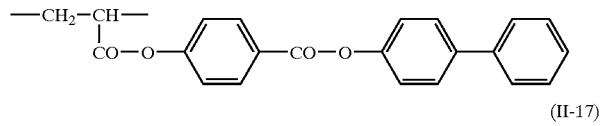

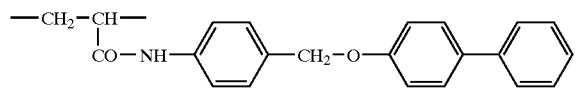

-continued
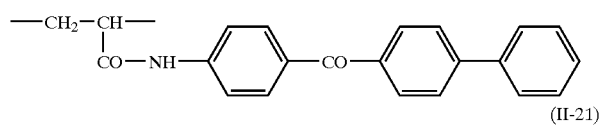 (II-19)
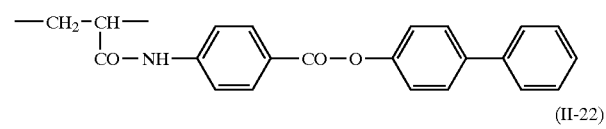 (II-20)
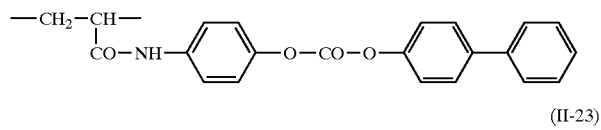 (II-21)
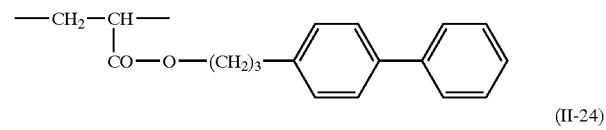 (II-22)
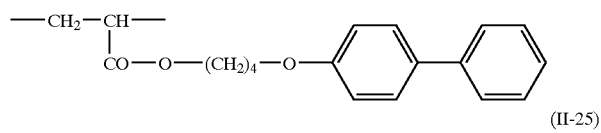 (II-23)
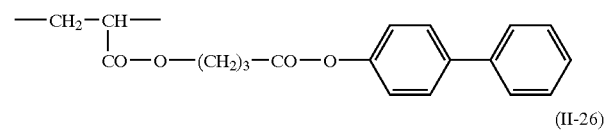 (II-24)
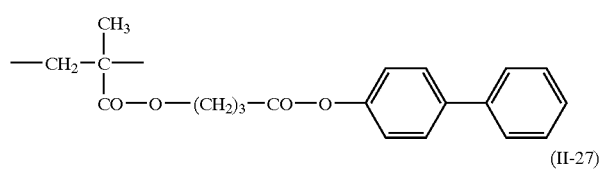 (II-25)
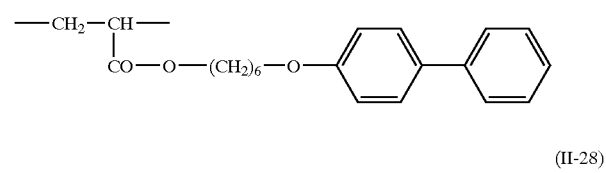 (II-26)
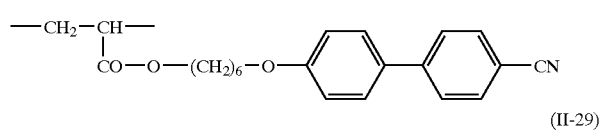 (II-27)
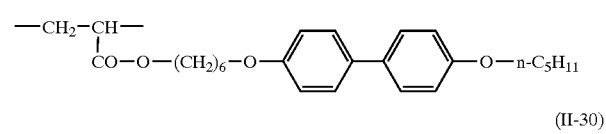 (II-28)
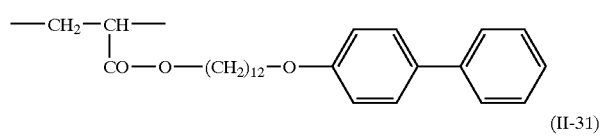 (II-29)
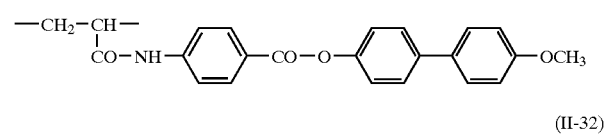 (II-30)
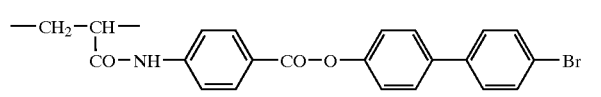 (II-31)
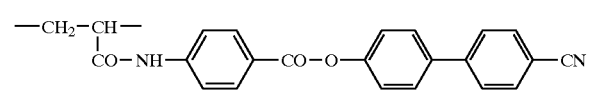 (II-32)
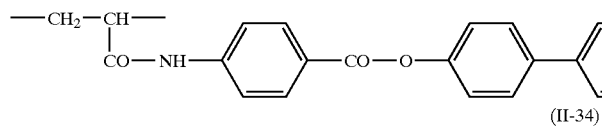 (II-33)
 (II-34)
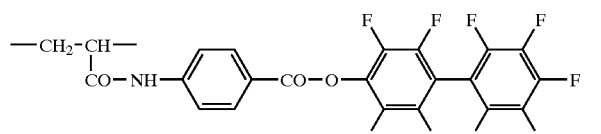 (II-35)
 (II-36)
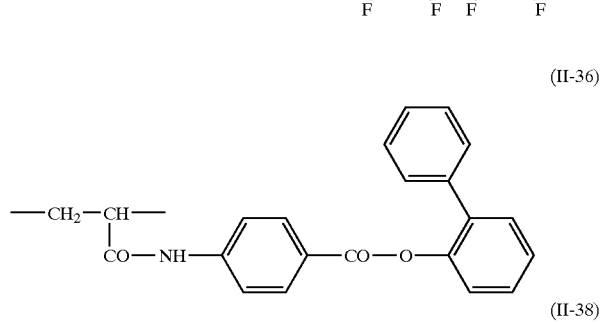 (II-37)
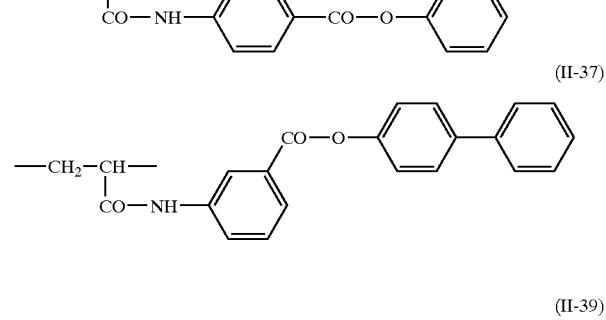 (II-38)
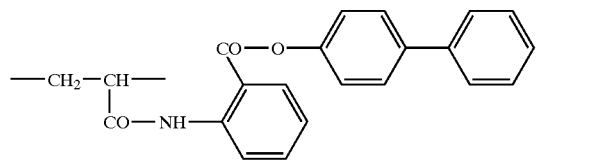 (II-39)
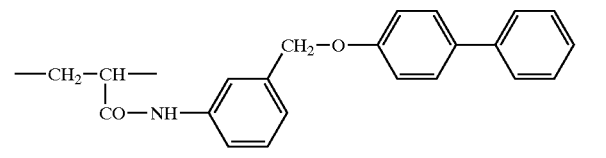

-continued

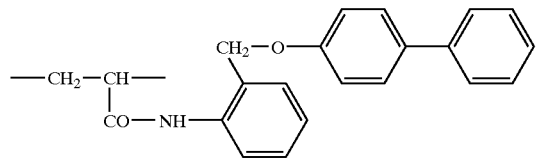 (II-40)

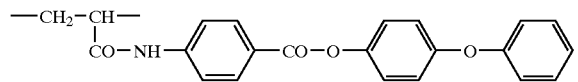 (II-41)

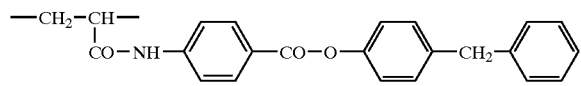 (II-42)

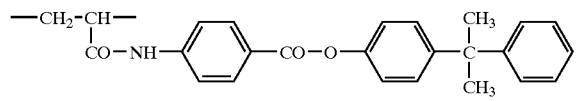 (II-43)

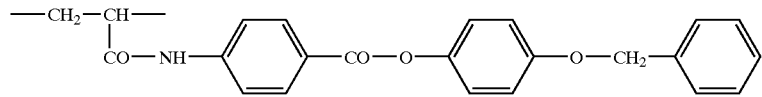 (II-44)

 (II-45)

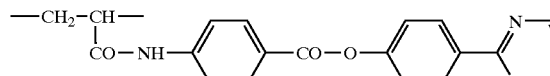 (II-46)

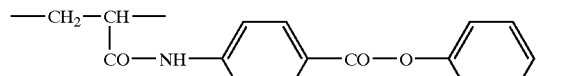 (II-47)

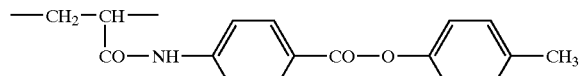 (II-48)

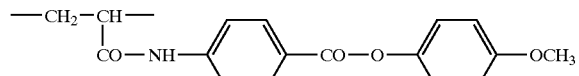 (II-49)

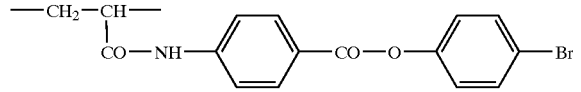 (II-50)

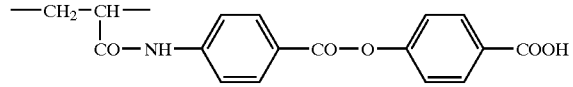 (II-51)

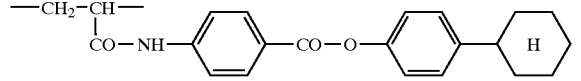 (II-52)

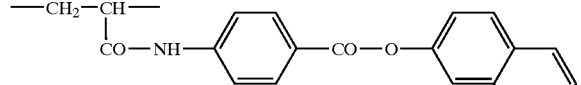 (II-53)

 (II-54)

 (II-55)

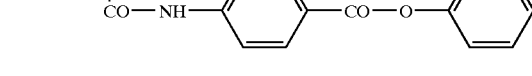 (II-56)

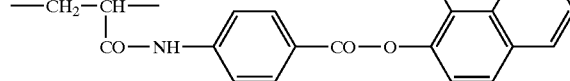 (II-57)

Examples of the (meth)acrylic copolymers (except that $L^2$, $L^3$ or $L^4$ is —C≡C—) are shown below. AA means a repeating unit derived from acrylic acid (alkali metal salt), and MA means a repeating unit derived from methacrylic acid (alkali metal salt). The ratio of the repeating unit means mol %.

PA101: -(AA)60-(II-1)40-
PA102: -(AA)70-(II-2)30-
PA103: -(AA)60-(II-5)40-
PA104: -(AA)65-(II-9)35-
PA105: -(AA)70-(II-11)30-
PA106: -(AA)80-(II-15)20-
PA107: -(AA)70-(II-15)30-
PA108: -(AA)60-(II-15)40-
PA109: -(AA)70-(II-16)30-

PA110: -(AA)60-(II-16)40-
PA111: -(AA)50-(II-16)50-
PA112: -(AA)70-(II-18)30-
PA113: -(AA)60-(II-18)40-
PA114: -(AA)50-(II-18)50-
PA115: -(AA)60-(II-23)40-
PA116: -(AA)60-(II-25)40-
PA117: -(AA)60-(II-32)40-
PA118: -(AA)60-(II-35)40-
PA119: -(AA)60-(II-37)40-
PA120: -(AA)60-(II-45)40-
PA121: -(AA)60-(II-55)40-
PA122: -(MA)60-(II-1)40-
PA123: -(MA)70-(II-2)30-
PA124: -(MA)60-(II-5)40-
PA125: -(MA)65-(II-9)35-
PA126: -(MA)70-(II-11)30-
PA127: -(MA)80-(II-15)20-
PA128: -(MA)70-(II-15)30-
PA129: -(MA)60-(II-15)40-
PA130: -(MA)70-(II-16)30-
PA131: -(MA)60-(II-16)40-
PA132: -(MA)50-(II-16)50-
PA133: -(MA)70-(II-18)30-
PA134: -(MA)60-(II-18)40-
PA135: -(MA)60-(II-18)40-
PA136: -(MA)60-(II-23)40-
PA137: -(MA)60-(II-25)40-
PA138: -(MA)60-(II-32)40-
PA139: -(MA)60-(II-35)40-
PA143: -(MA)60-(II-37)40-
PA141: -(MA)60-(II-45)40-
PA142: -(MA)60-(II-55)40-

The side chain of the repeating unit preferably has a tolan structure (wherein $L^2$, $L^3$ or L4 is —C≡C—, and the rings attached to both sides of —C≡C— are aromatic hydrocarbon rings).

Examples of the repeating unit having the side chain of a tolan structure are shown below.

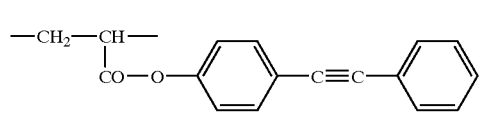
(II-101)

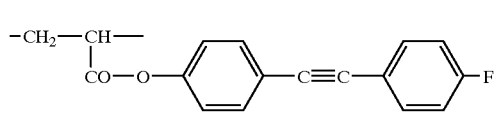
(II-102)

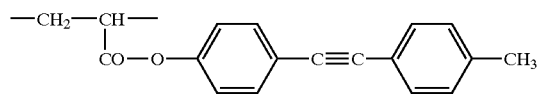
(II-103)

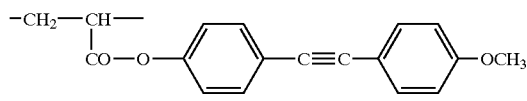
(II-104)

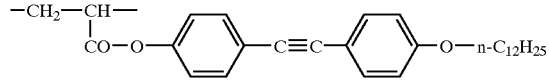
(II-105)

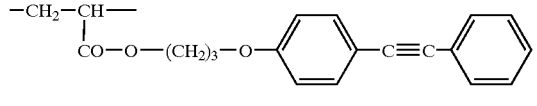
(II-106)

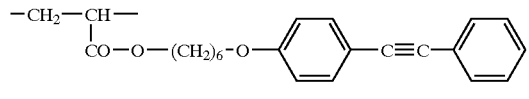
(II-107)

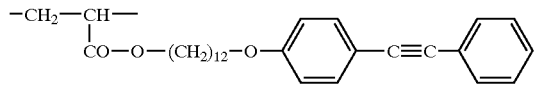
(II-108)

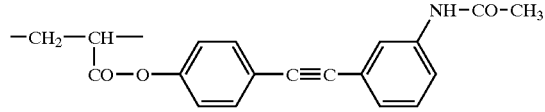
(II-109)

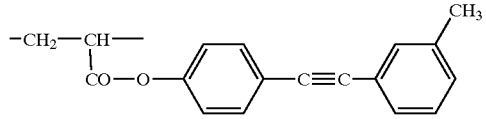
(II-110)

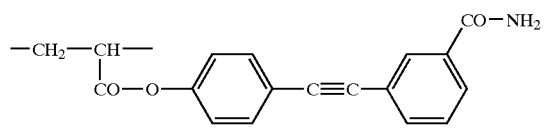
(II-111)

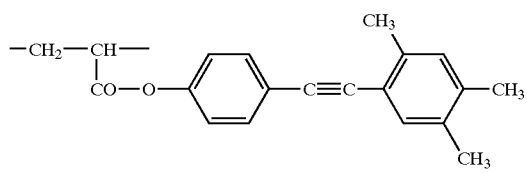
(II-112)

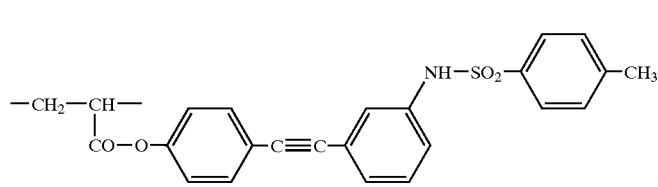
(II-113)

-continued
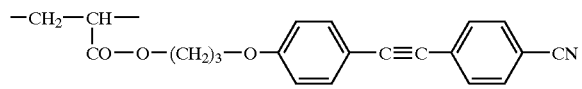
(II-114)
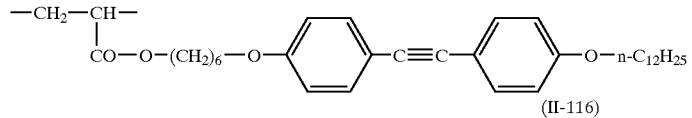
(II-115)
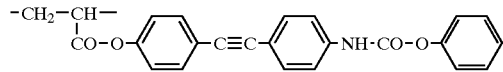
(II-116)
(II-117)
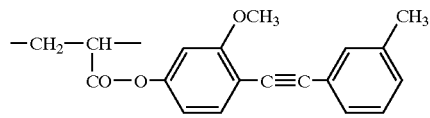
(II-118) (II-119)
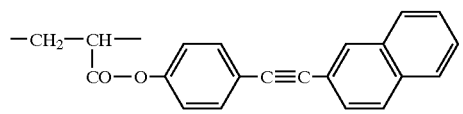
(II-120) (II-121)
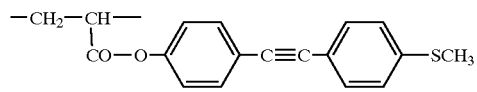
(II-122) (II-123)
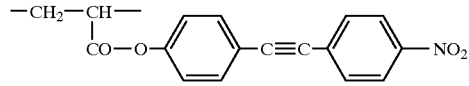
(II-124) (II-125)
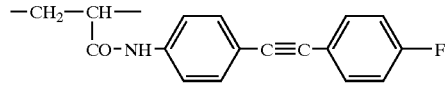
(II-126) (II-127)
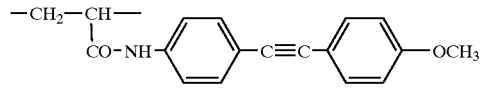
(II-128) (II-129)
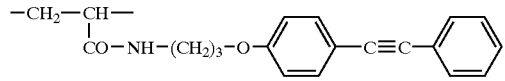
(II-130) (II-131)
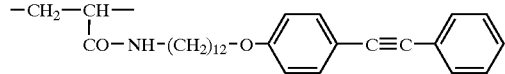
(II-132)
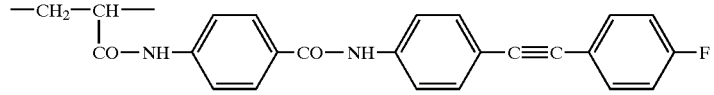
(II-133)
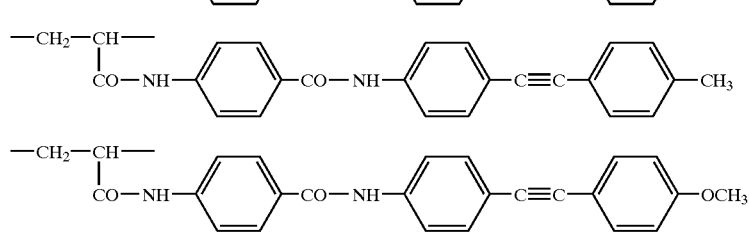
(II-134)
(II-135)
(II-136)

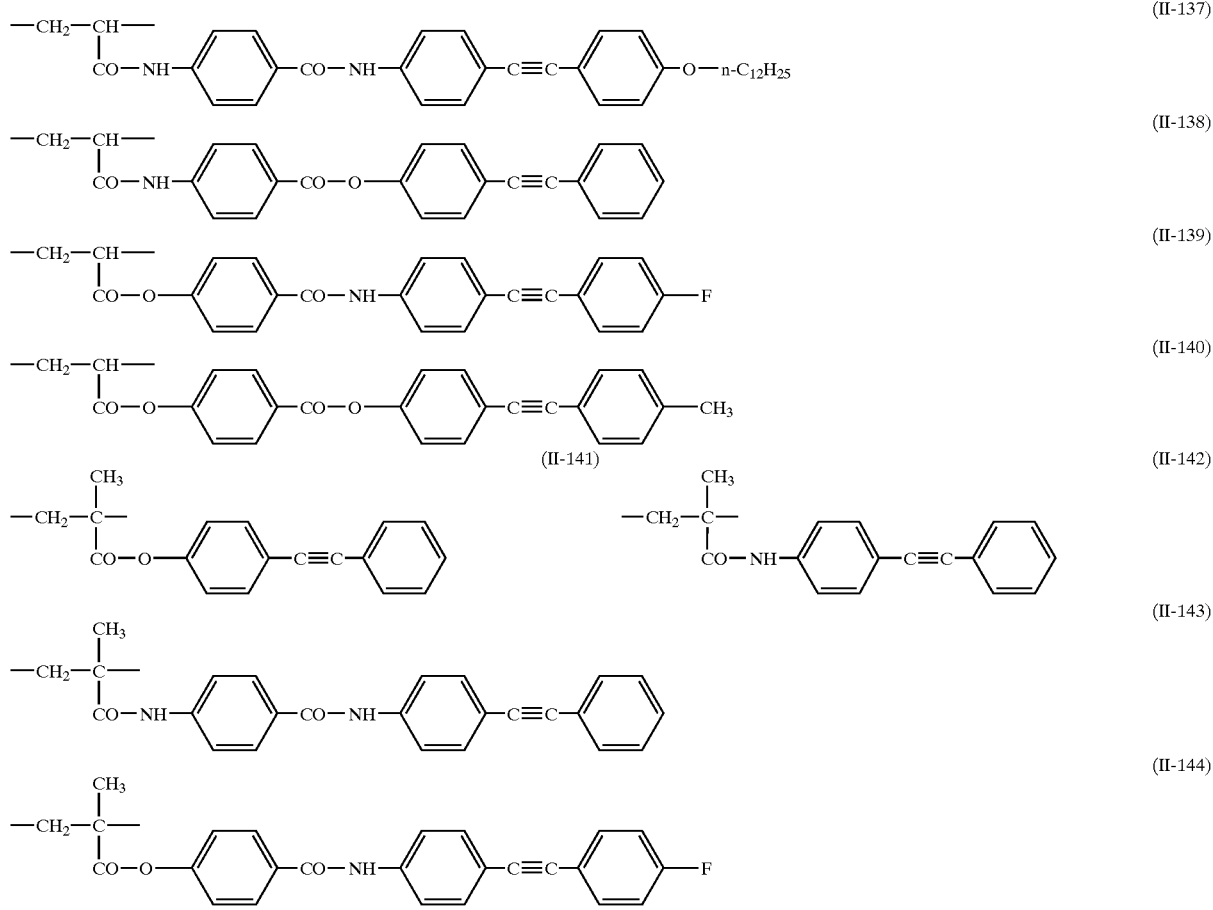

Examples of the (meth)acrylic Copolymers comprising the repeating units having a tolan structure are shown below. AA means a repeating unit derived from acrylic acid (alkali metal salt), and MA means a repeating unit derived from methacrylic acid (alkali metal salt). The ratio of the repeating unit means mol %.

PA201: -(AA)60-(II-101)40-
PA202: -(AA)70-(II-101)30-
PA203: -(AA)60-(II-102)40-
PA204: -(AA)65-(II-107)35-
PA205: -(AA)70-(II-111)30-
PA206: -(AA)80-(II-114)20-
PA207: -(AA)70-(II-120)30-
PA208: -(AA)60-(II-123)40-
PA209: -(AA)70-(II-125)30-
PA210: -(AA)60-(II-125)40-
PA211: -(AA)50-(II-125)50-
PA212: -(AA)70-(II-126)30-
PA213: -(AA)60-(II-128)40-
PA214: -(AA)50-(II-132)50-
PA215: -(AA)70-(II-133)30-
PA216: -(AA)60-(II-133)40-
PA217: -(AA)70-(II-138)30-
PA218: -(AA)60-(II-138)40-
PA219: -(AA)60-(II-139)40-
PA220: -(AA)60-(II-141)40-
PA221: -(AA)60-(II-143)40-
PA222: -(MA)60-(II-101)40-
PA223: -(MA)70-(II-101)30-
PA224: -(MA)60-(II-102)40-
PA225: -(MA)65-(II-107)35-
PA226: -(MA)70-(II-111)30-
PA227: -(MA)80-(II-114)20-
PA228: -(MA)70-(II-120)30-
PA229: -(MA)60-(II-123)40-
PA230: -(MA)70-(II-125)30-
PA231: -(MA)60-(II-125)40-
PA232: -(MA)50-(II-125)50-
PA233: -(MA)70-(II-126)30-
PA234: -(MA)60-(II-128)40-
PA235: -(MA)50-(II-132)50-
PA236: -(MA)70-(II-133)30-
PA237: -(MA)60-(II-133)40-
PA238: -(MA)70-(II-138)30-
PA239: -(MA)60-(II-138)40-
PA240: -(MA)60-(II-139)40-
PA241: -(MA)60-(II-141)40-
PA242: -(MA)60-(II-142)40-
PA243: -(MA)60-(II-143)40-

The (meth)acrylic copolymer can have a polymerizable group. A copolymer having a polymerizable group is used in combination with a discotic liquid crystal molecule having a polymerizable group to chemically bind the copolymer and the liquid crystal molecule along an interface between an optically anisotropic layer and an orientation layer. The mechanical strength of an optically anisotropic sheet using discotic liquid crystal molecules can be improved by the chemical bond.

The polymerizable group of the (meth)acrylic copolymer is determined depending on the polymerizable group (Q) of the liquid crystal molecule (described below). The polymerizable group (Q) of the liquid crystal molecule preferably is an unsaturated polymerizable group (Q1 to Q7 in the examples described about liquid crystal molecule), an epoxy group (Q8) or an aziridinyl group (Q9), more preferably is an unsaturated polymerizable group, and most preferably is an ethylenically unsaturated group (Q1 to Q6). The polymerizable group of the (meth)acrylic copolymer is also preferably is an unsaturated polymerizable group, an aziridinyl group or an epoxy group, more preferably is an unsaturated polymerizable group, and most preferably is an ethylenically unsaturated group.

The polymerizable group is preferably not directly attached to the main chain of the (meth)acrylic copolymer. In other words, a linking group preferably intervenes between the main chain and the polymerizable group. Examples of the linking groups include —CO—, —CO—O—, —CO—NH—, —CO—NH-alkylene-, —CO—NH-alkylene-O—, —CO—NH-alkylene-CO—O—, —CO—NH-alkylene-O—CO—, —CO—NH-alkylene-CO—NH—, —CO-alkylene-O—CO—, —CO-arylene-O-alkylene-O—CO—, —CO-arylene-O-alkylene-O—, —CO-arylene-O-alkylene- and —CO-alkylene-O—CO—, in which the left side is attached to the main chain, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group. Examples of the substituent groups include a halogen atom (F, Cl, Br), carboxyl, cyano, nitro, carbamoyl, sulfamoyl, an alkyl group, a cycloalkyl group, an alkoxy group, an alkylthio group, an acyl group, an acyloxy group, an alkylcarbamoyl group, an alkylsulfamoyl group, an amido group, a sulfonamido group and an alkylsulfonyl group.

The alkyl group can have a branched structure. The alkyl group preferably contains 1 to 20 carbon atoms, more preferably contains 1 to 15 carbon atoms, further preferably contains 1 to 10 carbon atoms, and most preferably contains 1 to 6 carbon atoms.

The cycloalkyl group preferably is cyclohexyl.

The alkoxy group can have a branched structure. The alkoxy group preferably contains 1 to 20 carbon atoms, more preferably contains 1 to 15 carbon atoms, further preferably contains 1 to 10 carbon atoms, and most preferably contains 1 to 6 carbon atoms.

The alkylthio group can have a branched structure. The alkylthio group preferably contains 1 to 20 carbon atoms, more preferably contains 1 to 15 carbon atoms, further preferably contains 1 to 10 carbon atoms, and most preferably contains 1 to 6 carbon atoms.

The acyl group preferably contains 2 to 20 carbon atoms, more preferably contains 2 to 15 carbon atoms, further preferably contains 2 to 10 carbon atoms, and most preferably contains 2 to 6 carbon atoms.

The acyloxy group preferably contains 2 to 20 carbon atoms, more preferably contains 2 to 15 carbon atoms, further preferably contains 2 to 10 carbon atoms, and most preferably contains 2 to 6 carbon atoms.

The alkylcarbamoyl group preferably contains 2 to 20 carbon atoms, more preferably contains 2 to 15 carbon atoms, further preferably contains 2 to 10 carbon atoms, and most preferably contains 2 to 6 carbon atoms. The alkyl moiety of the alkylcarbamoyl group can further have a substituent group (e.g., an alkoxy group).

The alkylsulfamoyl group preferably contains 2 to 20 carbon atoms, more preferably contains 2 to 15 carbon atoms, further preferably contains 2 to 10 carbon atoms, and most preferably contains 2 to 6 carbon atoms. The alkyl moiety of the alkylsulfamoyl group can further have a substituent group (e.g., an alkoxy group).

The amido group preferably contains 2 to 20 carbon atoms, more preferably contains 2 to 15 carbon atoms, further preferably contains 2 to 10 carbon atoms, and most preferably contains 2 to 6 carbon atoms.

The sulfonamido group preferably contains 1 to 20 carbon atoms, more preferably contains 1 to 15 carbon atoms, further preferably contains 1 to 10 carbon atoms, and most preferably contains 1 to 6 carbon atoms.

The alkylsulfonyl group preferably contains 1 to 20 carbon atoms, more preferably contains 1 to 15 carbon atoms, further preferably contains 1 to 10 carbon atoms, and most preferably contains 1 to 6 carbon atoms. The alkyl moiety of the alkylsulfonyl group can further have a substituent group (e.g., an alkoxy group).

The side chain of the repeating unit can have two or more polymerizable groups.

The polymerizable groups are introduced into the side chains of repeating units, or otherwise they are introduced into the repeating units represented by the formula (II).

The repeating unit having the polymerizable group at the side chain is preferably represented by the formula (III).

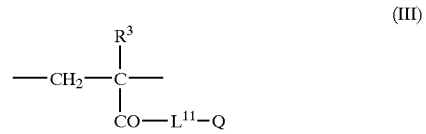

(III)

In the formula (III), $R^3$ is hydrogen or methyl.

In the formula (III), $L^1$ is a divalent linking group selected from the group consisting of —NH-alkylene-O—CO—, -alkylene-O—CO—, —O-alkylene-O—CO—, —O-arylene-O-alkylene-O—CO—, —O-arylene-O-alkylene-, —O-arylene-O—, —NH-alkylene-O—CO—, —NH-alkylene-O— and —NH-alkylene. $L^{11}$ preferably is —NH-alkylene-O—CO—, -alkylene-O—CO—, —O-alkylene-O—CO—, —O-arylene-O-alkylene-O—CO— or —NH-alkylene-O—CO—, and more preferably is —NH-alkylene-O—CO—.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group. Examples of the substituent groups are the same as the above-described substituent groups.

In the formula (III), Q is a polymerizable group. The polymerizable group of the (meth)acrylic copolymer is preferably analogous to the polymerizable group (Q) of the liquid crystal molecule, as is described above.

Examples of the repeating units having a polymerizable group at the side chain are shown below.

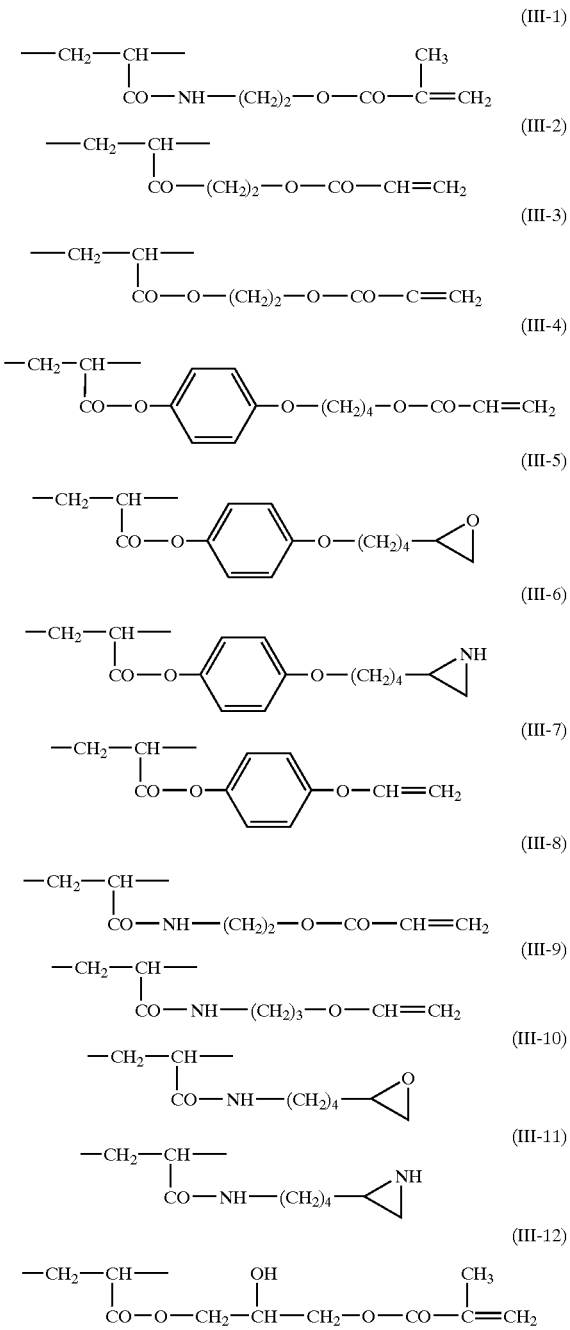

In the case that a repeating unit having a polymerizable group at the side chain is introduced into a (meth)acrylic copolymer, the copolymer preferably contains the polymerizable repeating units in an amount of 0.1 to 10 mol %, and more preferably in an amount of 3 to 5 mol %.

The polymerizable group introduced into the repeating unit represented by the formula (II) is preferably a substituent group of aromatic ring, more preferably a substituent group of aromatic ring positioned at the end of the side chain.

The polymerizable group is preferably not directly attached to the aromatic ring. In other words, a linking group preferably intervenes between the aromatic ring and the polymerizable group. Examples of the linking groups include —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene-, —O-alkylene- and -alkylene-O—, in which the left side is attached to the aromatic ring, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The alkynylene group can have a branched or cyclic structure. The alkynylene group contains preferably 2 to 30 carbon atoms, more preferably 2 to 20 carbon atoms, further preferably 2 to 15 carbon atoms, and most preferably 2 to 12 carbon atoms.

The aromatic ring (including aromatic heterocyclic ring) can have two or more polymerizable groups.

A repeating unit obtained by introducing the polymerizable group to the repeating unit represented by the formula (II) is preferably represented by the formula (IV).

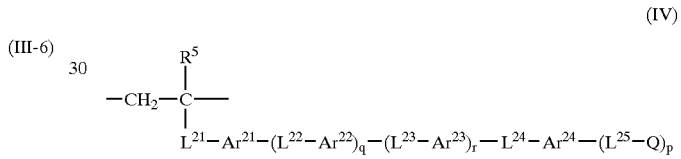

In the formula (IV), $R^5$ is hydrogen or methyl.

In the formula (IV), $L^{21}$ is a single bond or a divalent linking group selected from the group consisting of —CO—, —CO—NH—, -alkylene-, —CO—NH-alkylene-, —CO—NH-alkylene-O—, —CO—NH-alkylene-CO—O— and —CO—NH-alkylene-CO—NH—, preferably is —CO—, —CO—NH— or -alkylene, and more preferably is —CO—NH—.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

In the formula (IV), each of $L^{22}$, $L^{23}$, $L^{24}$ and $L^{25}$ independently is a single bond, —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene-, —O-alkylene- or -alkylene-O—. At least one of $L^{22}$, $L^{23}$ and $L^{24}$ preferably is a single bond or -alkynylene-.

In the formula (IV), each of $Ar^{21}$, $Ar^{22}$, $Ar^{23}$ and $Ar^{24}$ independently is an aromatic ring (including an aromatic heterocyclic ring), and preferably is benzene ring. Each of $Ar^{21}$, $Ar^{22}$ and $Ar^{23}$ preferably is p-phenylene. The aromatic ring can have a substituent group. Examples of the substituent groups are the same as the examples of the substituent groups of the aromatic ring in the formula (VI).

In the formula (IV), each of q and r is 0 or 1. It is preferred that q be 0 or 1 and r be 0 (two or three aromatic rings). It is more preferred that each of q and r be 0 (two aromatic rings).

In the formula (IV), p is 1, 2, or 3, preferably is 1 or 2, and more preferably is 1.

Examples of the repeating units having the polymerizable group and two or more aromatic rings at the side chain are shown below.

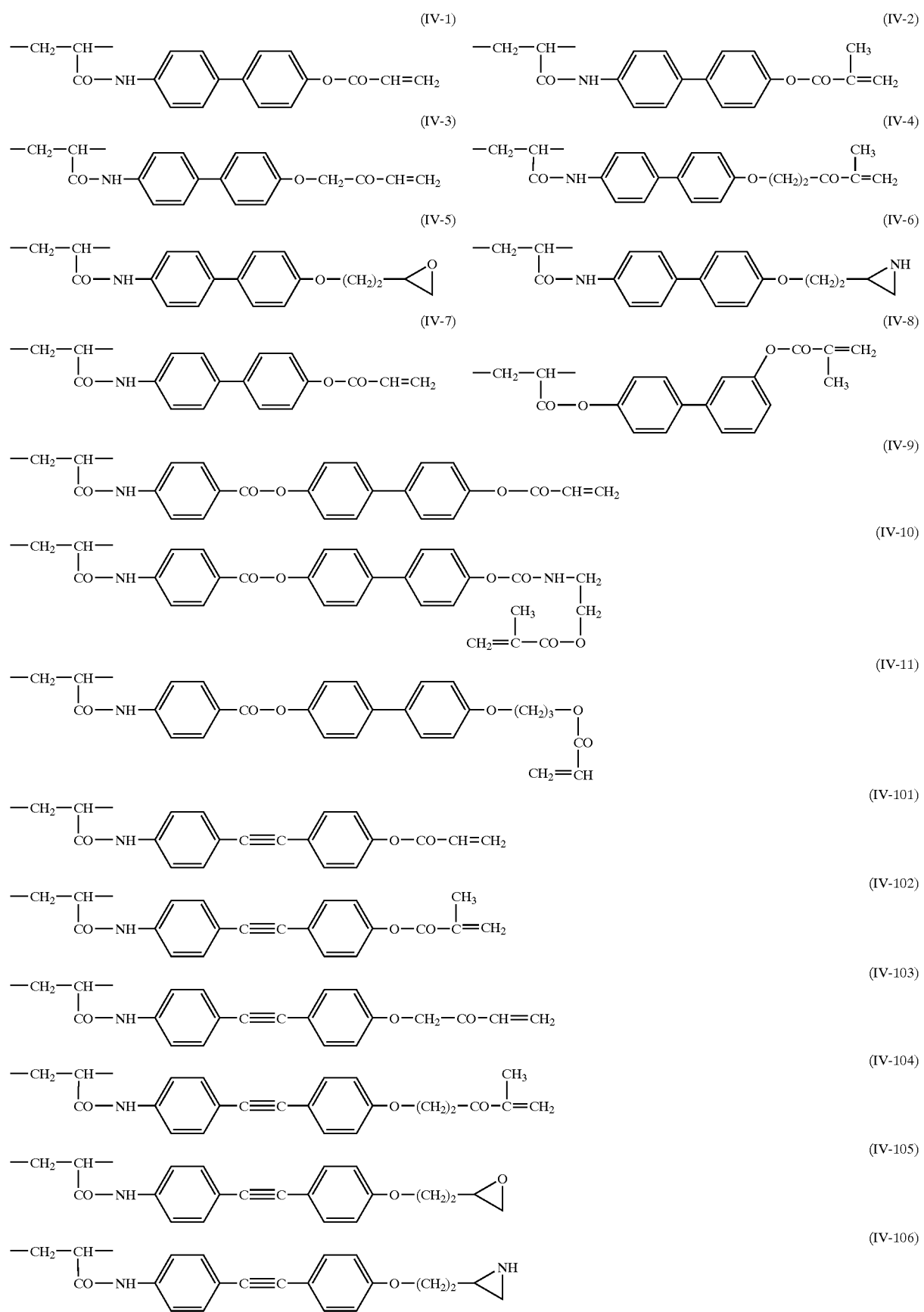

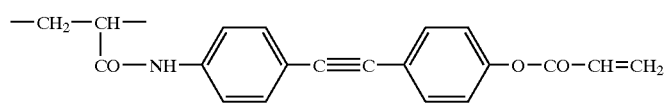
(IV-107)

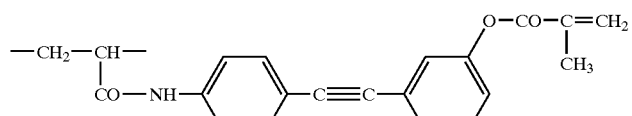
(IV-108)

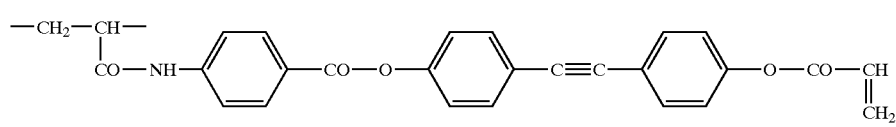
(IV-109)

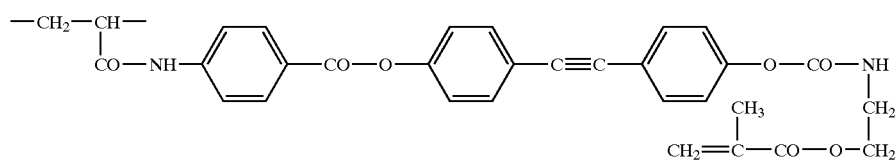
(IV-110)

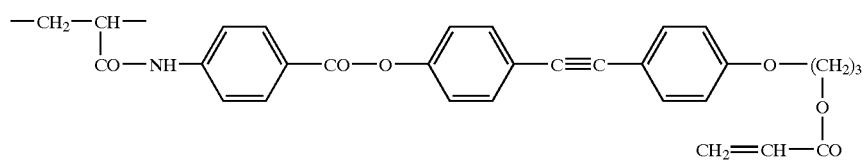
(IV-111)

The orientation layer has a thickness preferably in the range of 0.01 to 10 μm, more preferably in the range of 0.05 to 5 μm, and most preferably in the range of 0.1 to 1

After aligning discotic liquid crystal molecules in an optically anisotropic layer, the formed layer can be transferred onto a transparent support. Since the liquid crystal molecules are fixed, the alignment can be kept without the orientation layer.

The orientation layer is preferably formed by a process, which comprises the steps of: coating a solution of the (meth)acrylic copolymer on a support to form a coated layer; drying the coated layer; rubbing a surface of the coated layer; and heating the coated layer.

The coated layer is heated preferably at 50 to 300° C., more preferably at 50 to 250° C., and most preferably at 100 to 250° C.

The coated layer can be heated by, for example, attaching the layer on the support to a surface of a heating medium, placing the layer on the support in a heated vessel, or splaying a hated gas (preferably, air) to the layer on the support along a rubbing direction. The heating medium preferably is a plate. The heating time depends on the heating temperature. Where the heating temperature is 100° C., the heating time is preferably in the range of 1 to 30 minutes. Where the heating temperature is 130° C., the heating time is preferably in the range of 30 seconds to 10 minutes. Where the heating temperature is 160° C., the heating time is preferably in the range of 10 seconds to 3 minutes. The interval between the rubbing treatment and the heating treatment is preferably not longer than 1 week, more preferably not longer than 3 days, and most preferably not longer than 3 hours.

[Optically Anisotropic Layer]

The optically anisotropic layer comprises discotic liquid crystal molecules, which are aligned by the above-described orientation layer so that their discotic planes are arranged essentially vertically (at the average inclined angle of 50 to 90°) to the orientation layer. The discotic liquid crystal molecules are preferably fixed in the optically anisotropic layer with their vertical (homogeneous) alignment maintained. The discotic liquid crystal molecules are preferably fixed by a polymerization reaction.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula.

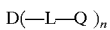

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).
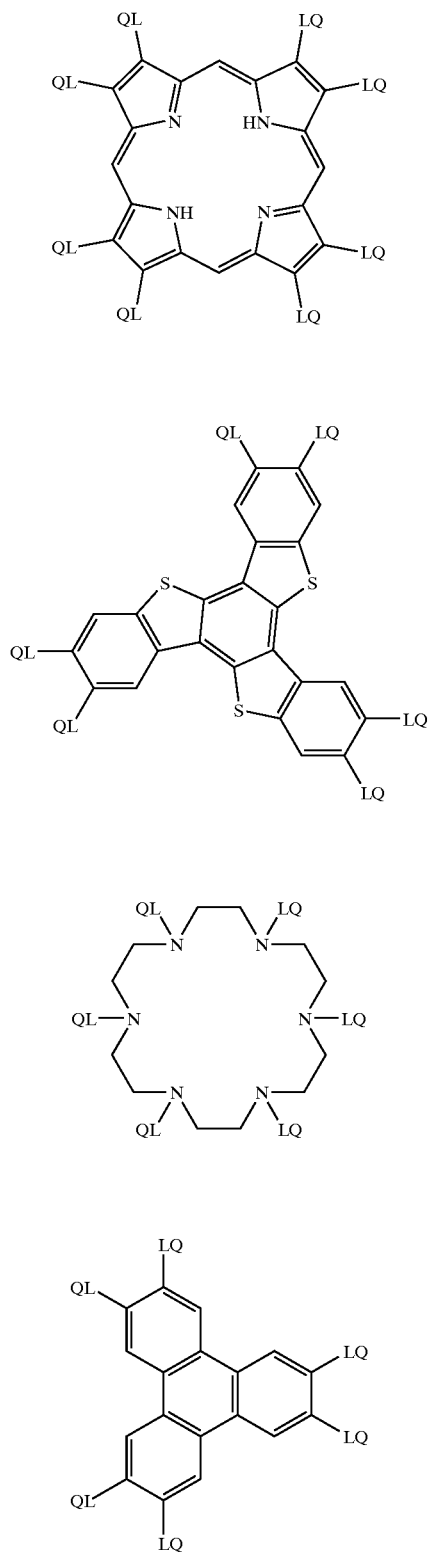
(D1)
(D2)
(D3)
(D4)
-continued
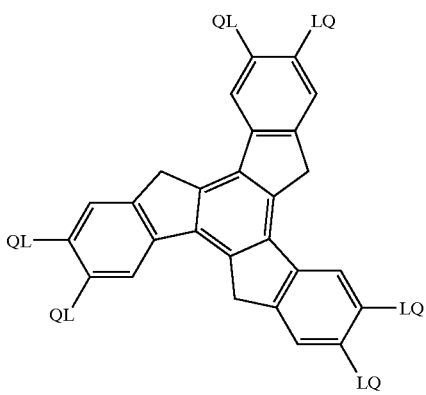
(D5)
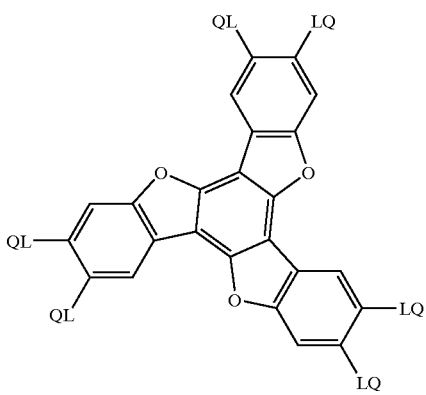
(D6)
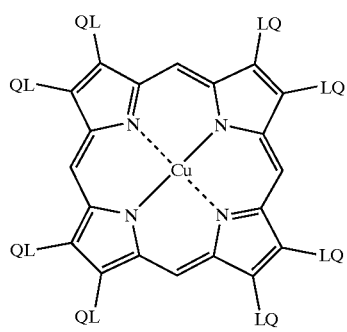
(D7)
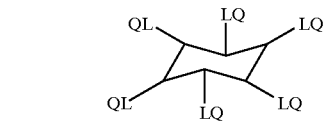
(D8)
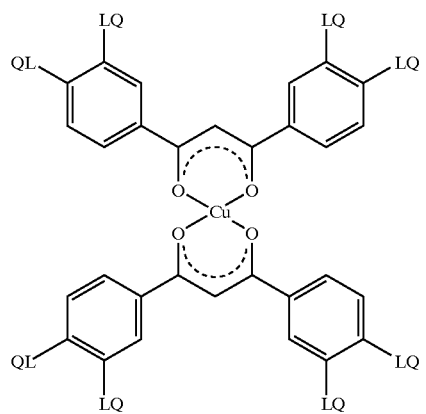
(D9)

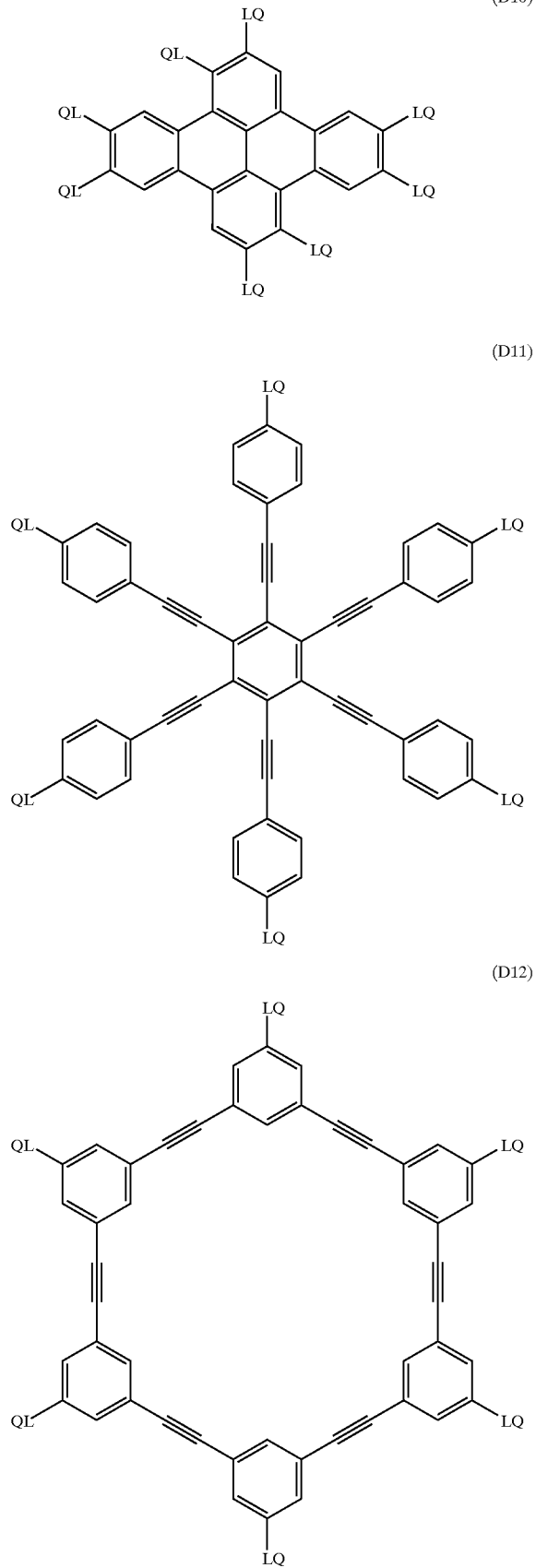
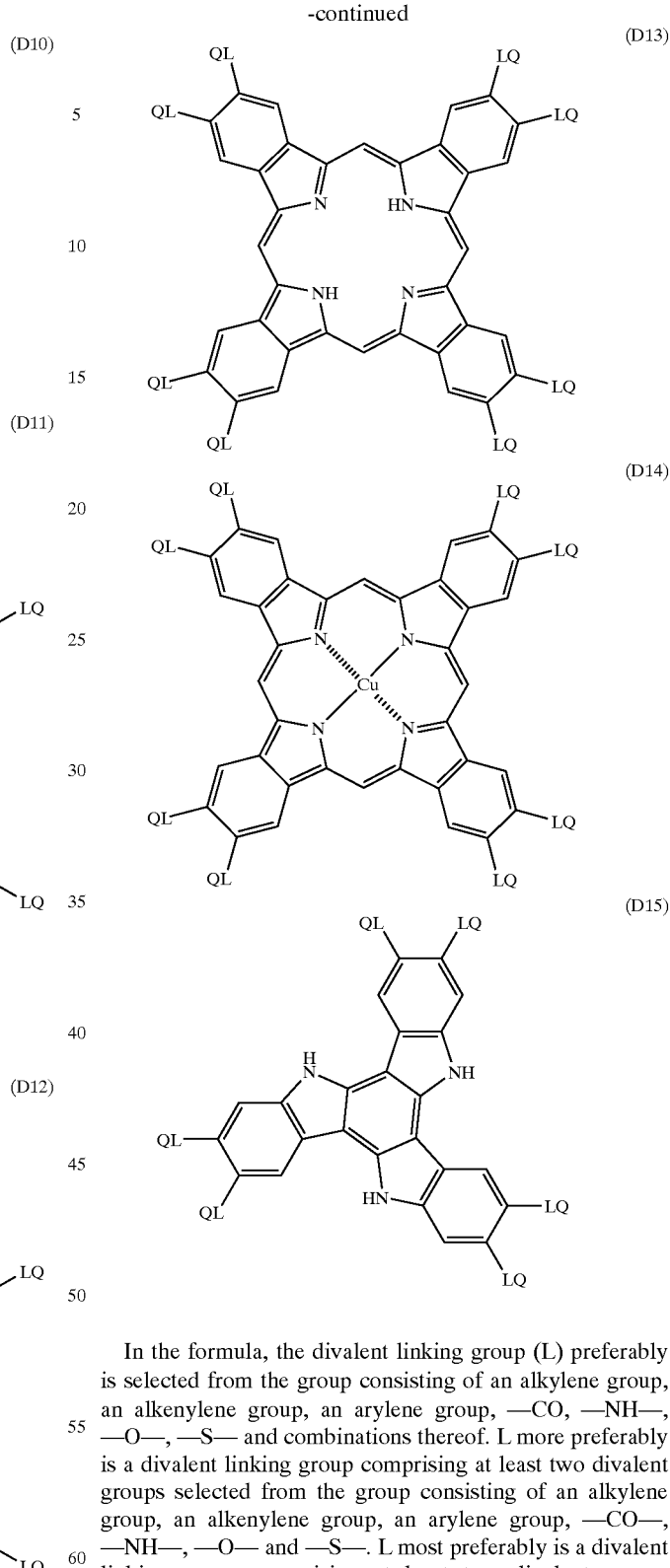

In the formula, the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an alkenylene group, an arylene group, —CO—, —NH—, —O— and —S—. L most preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The polymerizable group (Q) is determined by the polymerization reaction. Examples of the polymerizable groups (Q) are shown below.

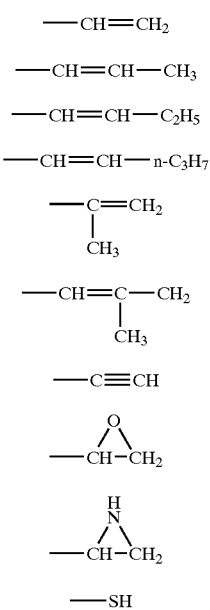

-continued

—CHO  (Q11)
—OH  (Q12)
—CO$_2$H  (Q13)
—N=C=O  (Q14)
—NH$_2$  (Q15)
—SO$_3$H  (Q16)
—N=C=S  (Q17)

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula, n is an integer of 4 to 12, which is determined by the chemical structure of the discotic core (D). The 4 to 12 combinations of L and Q can be different from each other. However, the combinations are preferably identical.

Two or more discotic liquid crystal molecules can be used in combination. For example, a molecule having a polymerizable group (Q) can be used in combination with a molecule having no polymerizable group (non-polymerizable discotic liquid crystal molecule).

The discotic liquid crystal molecule having no polymerizable group (non-polymerizable discotic liquid crystal molecule) is obtained by replacing the polymerizable group (Q) of the above-described polymerizable discotic liquid crystal molecule with hydrogen or an alkyl group. Accordingly, the discotic liquid crystal molecule having no polymerizable group preferably is a compound represented by the following formula.

D(—L—R)$_n$ in which D is a discotic core; L is a divalent linking group; R is hydrogen or an alkyl group; and n is an integer of 4 to 12.

Examples of the discotic cores are the same as the examples of the cores in the polymerizable discotic liquid crystal molecule, except that LQ or QL is replaced with LR or RL, respectively.

Examples of the divalent linking groups are also the same as the examples of the linking groups in the polymerizable discotic liquid crystal molecule.

The alkyl group of R contains preferably 1 to 40 carbon atoms, and more preferably 1 to 30 carbon atoms. An alkyl group preferably has a chain structure rather than a cyclic structure. An alkyl group having a straight chain (normal alkyl group) is preferred to a branched alkyl group. R particularly preferably is hydrogen or a normal alkyl group having 1 to 30 carbon atoms.

The optically anisotropic layer can contain a fluorine-containing surface active agent or a cellulose ester, which has a function of uniformly and essentially vertically (homogeneously) aligning discotic liquid crystal molecules placed near an interface between the layer and the air.

The fluorine-containing surface active agent comprises a hydrophobic group containing fluorine, a nonionic, anionic, cationic or amphoteric hydrophilic group and an optional linking group.

The fluorine-containing surface active agent may have two or more hydrophobic groups containing fluorine or two or more hydrophilic groups. Two or more fluorine-containing surface active agents can be used in combination.

The surface active agents are described in various documents, such as Hiroshi Horiguchi, New Surface Active Agents, Sankyo Shuppan, 1975 (written in Japanese), M. J. Schick, Nonionic Surfactants, Marcell Dekker Inc., New York, 1967 and Japanese Patent Provisional Publication No. 7(1995)-13293.

The fluorine-containing surface active agent is used in an amount of 0.01 to 30 wt. % based on the amount of the discotic liquid crystal molecules. The amount is preferably in the range of 0.05 to 10 wt. %, and more preferably in the range of 0.1 to 5 wt. %.

The cellulose ester preferably is a cellulose ester of a lower fatty acid.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate.

The coating amount of the cellulose ester is preferably in the range of 0.005 to 0.5 $g/m^2$, more preferably in the range of 0.01 to 0.45 $g/m^2$, further preferably in the range of 0.02 to 0.4 $g/m^2$, and most preferably in the range of 0.03 to 0.35 $g/m^2$. The amount of the cellulose ester is also preferably in the range of 0.1 to 5 wt. % based on the amount of the discotic liquid crystal molecule.

An optically anisotropic layer can be formed by coating on an orientation layer a solution containing the discotic liquid crystal molecules and, if needed, the above-mentioned additive (a fluorine-containing surface active agent, a cellulose ester), and a polymerization initiator (described below).

A solvent for the preparation of the solution preferably is an organic solvent. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as an extrusion coating method, a direct gravure coating method, a reverse gravure coating method, a die coating method or a bar coating method.

The aligned discotic liquid crystal molecules are fixed while keeping their essentially vertical (homogeneous) alignment. The discotic liquid crystal molecules are fixed preferably by a polymerization reaction of the polymerizable groups (Q) in the molecules. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray.

The exposure energy is preferably in the range of 20 to 50,000 mJ per $cm^2$, and more preferably in the range of 100 to 2,000 mJ per $cm^2$. The light irradiation can be conducted while heating the layer to accelerate the photo polymerization reaction.

The optically anisotropic layer has a thickness preferably in the range of 0.1 to 50 $\mu$m, more preferably 1 to 30 $\mu$m, and most preferably in the range of 5 to 20 $\mu$m. In the case that two optical compensatory sheets are used in a liquid crystal display, the preferred thickness of the layer is half of the preferred thickness (described above) in the case that one optical compensatory sheet is used in a liquid crystal display.

The discotic liquid crystal molecules in the optically anisotropic layer are aligned at an average inclined angle in the range of 50° to 90°. The inclined angle is preferably uniform. However, the inclined angle can be changed if the angle is continuously changed along the thickness of the optical anisotropic layer.

The words "optical axes of the discotic liquid crystal molecules are parallel to the rubbing direction of the orientation layer" mean that those of the liquid crystal molecules near the orientation layer are parallel to the rubbing direction. Accordingly, as long as the liquid crystal molecules near the orientation layer are thus arranged, the molecules may be oriented slightly in twisted alignment from the orientation layer to the air.

The total retardation of optically anisotropic sheet is preferably adjusted by the optically anisotropic layer. A total retardation in plane (Re) of the optically anisotropic sheet is in the range of preferably 20 to 200 nm, more preferably 20 to 100 nm, and most preferably 20 to 70 nm. A total retardation along the thickness direction (Rth) of the optically anisotropic sheet is in the range of preferably 70 to 500 nm, more preferably 70 to 400 nm, and most preferably 70 to 300 nm. The Re and Rth retardation values are defined by the following formulas.

$$Re=(nx-ny) \times d$$

$$Rth=[\{(nx+ny)/2\}-nz] \times d$$

in which each of nx and ny is a refractive index in plane of the optically anisotropic sheet; nz is a refractive index along the thickness direction of the optically anisotropic sheet; and d is a thickness of the optically anisotropic sheet.

The total retardation of optically anisotropic sheet can be adjusted by combination of the optically anisotropic layer and the optically uniaxial or biaxial transparent support.

[Polarizing Film]

The polarizing film is an iodine polarizing film, a dye polarizing film comprising a dichromatic dye or a polyene polarizing film. The iodine polarizing film and the dye polarizing film are generally prepared from polyvinyl alcohol films. The transparent axis of the film is perpendicular to the stretched direction.

The polarizing film is placed so that the transparent axis may be essentially perpendicular to an average direction of lines obtained by projecting the optical axes of discotic liquid crystal molecules onto the support.

[Transparent Protective Film]

As the transparent protective film, a polymer film is used. Here, 'transparent' means that the film has an optical transmittance of not less than 80%.

The film is generally a cellulose ester film, preferably a triacetylcellulose film, which is preferably prepared according to the solvent casting method.

The thickness of the film is within preferably 20 to 500 μm, more preferably 50 to 200 μm.

[Liquid Crystal Display]

The present invention can be applied to liquid crystal displays of various modes. As described above, the optical compensatory sheets for liquid crystal cells of various modes have been proposed. Examples of the modes include TN (twisted nematic) mode, IPS (in-plane switching) mode, FLC (ferroelectric liquid crystal) mode, OCB (optically compensatory bend) mode, STN (super twisted nematic) mode, VA (vertically aligned) mode, ECB (electrically controlled birefringence) mode and HAN (hybrid aligned nematic) mode.

The optically anisotropic sheet of the invention are preferably used in a liquid crystal display in which the optical axes of discotic liquid crystal molecules are essentially perpendicular to the transparent axis of the polarizing film (i.e., the slow axis of the compensatory sheet is preferably essentially parallel to the transparent axis of the polarizing film), such as a liquid crystal display of TN or VA mode. The invention is particularly effective in a liquid crystal display of VA mode.

The liquid crystal cell of VA mode include: (1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied; (2) a liquid crystal cell of MVA mode (described in SID97, Digest of tech. Papers, 28(1997), 845), in which the VA mode is modified to be multi-domain type to enlarge the viewing angle; (3) a liquid crystal it cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied; and (4) a liquid crystal cell of SURVAIVAL mode (published in LCD international 98).

REFERENCE EXAMPLE 1

Preparation of Optically Anisotropic Sheet

The acrylic copolymer (PA210X) with triethylamine (counter ion, neutralizing agent) was dissolved in a mixture of methanol and water (volume ratio: 30/70) to prepare a 4 wt. % solution.

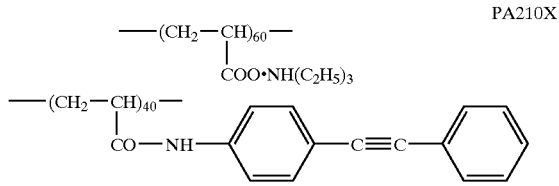

The solution was coated on the glass plate by means of a bar coater (thickness: 1 μm), and air-dried at 120° C. for 5 minutes. The surface was subjected to a rubbing treatment to form an orientation layer. The following coating solution was then coated on the orientation layer by means of a bar coater (thickness: 2 μm).

| Coating solution for optically anisotropic layer | |
| --- | --- |
| The following discotic liquid crystal compound (1) | 100 weight parts |
| Trimethylolpropane triacrylate denatured with ethylene oxide (V#360, Osaka Organic Chemicals Co., Ltd.) | 10 weight parts |
| A photopolymerization initiator (Irgacure 369, Ciba-Geigy) | 3 weight parts |
| Methyl ethyl ketone | 400 weight parts |

Discotic liquid crystal compound (1)

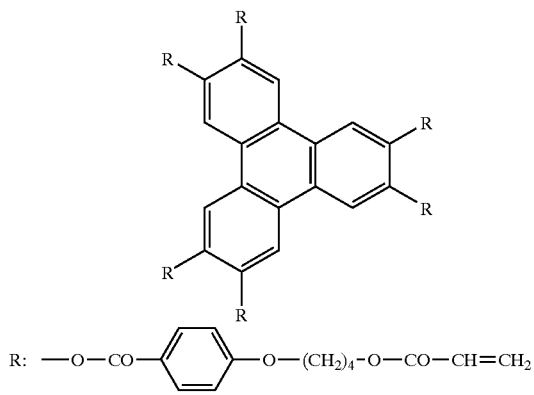

The coated layer was heated at 150° C. for 2 minutes to essentially vertically align the discotic liquid crystal molecules. At the heated temperature, the layer was irradiated with an ultraviolet ray for 4 seconds to polymerize the liquid crystal molecules and to fix the alignment.

The alignment and the director (average optical axes, namely, average direction of normal lines to the discotic planes) of the discotic liquid crystal molecules in the thus-prepared sheet were observed with a polarizing microscope. As a result, the director was perpendicular to the rubbing direction. The retardation in plane (Re) was also measured with an ellipsometer, and from the obtained angle dependence an average inclined angle was determined 89°.

REFERENCE EXAMPLES 2 to 15

Preparation of Optically Anisotropic Sheet

The procedure of Reference Example 1 was repeated except that the copolymer, the counter ion (neutralizing agent) and the discotic liquid crystal compound were changed as shown in Table 1, to prepare optically anisotropic sheets. In the Table 1, "X" and "Y" marked at the copolymers mean the counter ions (neutralizing agents) of triethylamine and ammonia, respectively.

The alignment and the director (average optical axes, namely, average direction of normal lines to the discotic planes) of the discotic liquid crystal molecules in each thus-prepared sheet were observed with a polarizing microscope. As a result, each director was perpendicular to the rubbing direction. The retardation in plane (Re) was also measured with an ellipsometer, and from the obtained angle dependence an average inclined angle was determined. The results are set forth in Table 1.

TABLE 1
| Optically anisotropic sheet | Copolymer | Discotic liquid crystal | Incline angle |
|---|---|---|---|
| Ref. Ex. 1 | PA210X | (1) | 89° |
| Ref. Ex. 2 | PA210X | (4) | 89° |
| Ref. Ex. 3 | PA210Y | (1) | 89° |
| Ref. Ex. 4 | PA216X | (1) | 89° |
| Ref. Ex. 5 | PA216X | (4) | 89° |
| Ref. Ex. 6 | PA216Y | (4) | 89° |
| Ref. Ex. 7 | PA242X | (1) | 89° |
| Ref. Ex. 8 | PA242X | (2) | 89° |
| Ref. Ex. 9 | PA242X | (3) | 89° |
| Ref. Ex. 10 | PA242X | (4) | 89° |
| Ref. Ex. 11 | PA242Y | (1) | 89° |
| Ref. Ex. 12 | PA242Y | (4) | 89° |
| Ref. Ex. 13 | PA243X | (1) | 89° |
| Ref. Ex. 14 | PA243X | (4) | 89° |
| Ref. Ex. 15 | PA243Y | (4) | 89° |
Discotic liquid crystal compound (2)
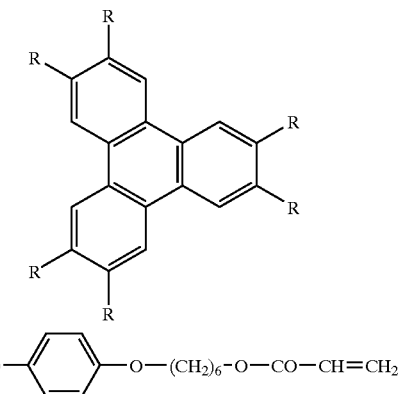
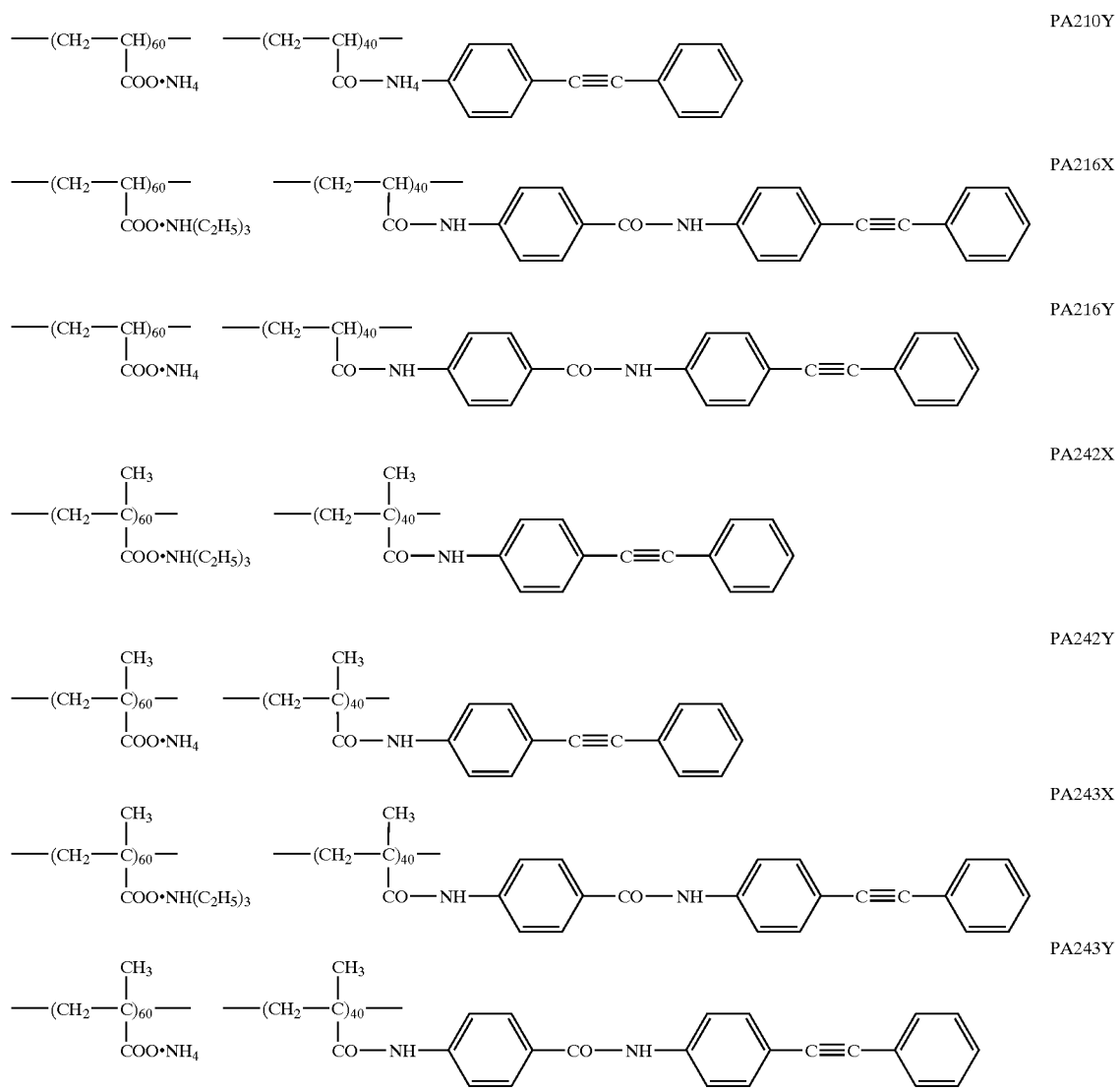

Discotic liquid crystal compound (3)

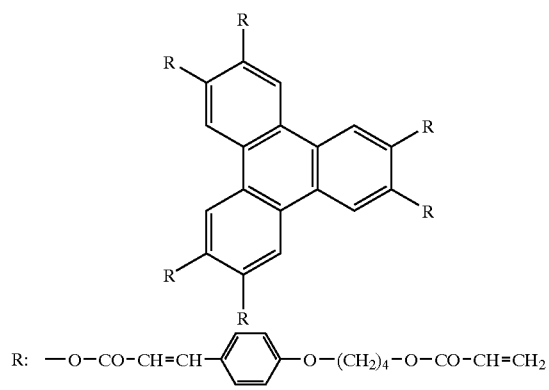

R: —O—CO—CH=CH—〈phenyl〉—O—(CH$_2$)$_4$—O—CO—CH=CH$_2$

Discotic liquid crystal compound (4)

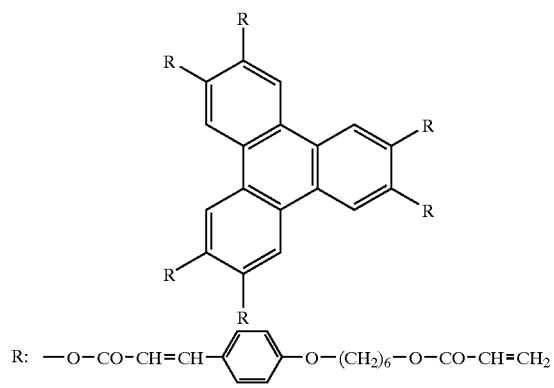

R: —O—CO—CH=CH—〈phenyl〉—O—(CH$_2$)$_6$—O—CO—CH=CH$_2$

EXAMPLES 1 to 28

Preparation of Optically Anisotropic Sheet

The procedure of Reference Example 1 was repeated except that the copolymer, the counter ion (neutralizing agent) and the discotic liquid crystal compound were changed as shown in Table 2, to prepare optically anisotropic sheets. In the Table 2, the mark Na, K, Li or Cs attached to the copolymer means that the counter ion (neutralizing agent) is sodium ion (sodium hydroxide), potassium ion (potassium hydroxide), lithium ion (lithium hydroxide) or cesium ion (cesium hydroxide).

The alignment and the director (average optical axes, namely, average direction of normal lines to the discotic planes) of the discotic liquid crystal molecules in each of the prepared sheets were observed with a polarizing microscope. As a result, each director was parallel to the rubbing direction. The retardation in plane (Re) was also measured with an ellipsometer, and from the obtained angle dependence an average inclined angle was determined. The results are set forth in Table 2.

TABLE 2

| Optically anisotropic sheet | Copolymer | Discotic liquid crystal | Incline angle |
|---|---|---|---|
| Example 1 | PA210Na | (1) | 89° |
| Example 2 | PA210Na | (2) | 89° |
| Example 3 | PA210Na | (3) | 90° |

TABLE 2-continued

| Optically anisotropic sheet | Copolymer | Discotic liquid crystal | Incline angle |
|---|---|---|---|
| Example 4 | PA210Na | (4) | 90° |
| Example 5 | PA210K | (4) | 90° |
| Example 6 | PA210Li | (4) | 90° |
| Example 7 | PA210Cs | (4) | 90° |
| Example 8 | PA216Na | (1) | 89° |
| Example 9 | PA216Na | (2) | 89° |
| Example 10 | PA216Na | (3) | 90° |
| Example 11 | PA216Na | (4) | 90° |
| Example 12 | PA216K | (4) | 90° |
| Example 13 | PA216Li | (4) | 90° |
| Example 14 | PA216Cs | (4) | 90° |
| Example 15 | PA242Na | (1) | 89° |
| Example 16 | PA242Na | (2) | 89° |
| Example 17 | PA242Na | (3) | 90° |
| Example 18 | PA242Na | (4) | 90° |
| Example 19 | PA242K | (4) | 90° |
| Example 20 | PA242Li | (4) | 90° |
| Example 21 | PA242Cs | (4) | 90° |
| Example 22 | PA243Na | (1) | 89° |
| Example 23 | PA243Na | (2) | 89° |
| Example 24 | PA243Na | (3) | 90° |
| Example 25 | PA243Na | (4) | 90° |
| Example 26 | PA243K | (4) | 90° |
| Example 27 | PA243Li | (4) | 90° |
| Example 28 | PA243Cs | (4) | 90° |

EXAMPLE 29

Preparation of Polarizing Plate

A rolled polyvinyl alcohol film (thickness: 80 μm) was continuously stretched to the extent of five times length in an aqueous solution of iodine, and dried to form a polarizing film. A rolled saponified cellulose triacetate film (Fuji Tac TD80UF, Fuji Photo Film Co., Ltd.) was laminated on one surface of the polarizing film. On the other surface, a saponified rolled optically anisotropic sheet prepared in Example 1 was so laminated that the optically anisotropic layer of the sheet is in contact with the polarizing film. Thus, a polarizing plate was prepared. The slow axis of the compensatory sheet (direction of the discotic planes of the discotic liquid crystal molecules) was parallel to the transparent axis of the polarizing film. In other words, the optical axes of the discotic liquid crystal molecules were perpendicular to the transparent axis of the polarizing film.

We claim:

1. A process for orienting discotic liquid crystal molecules, comprising the steps of: coating a solution of a copolymer comprising repeating units represented by the formula (I) and repeating units represented by the formula (II) on a support to form a coated layer, rubbing a surface of the coated layer to form an orientation layer; coating a solution containing discotic liquid crystal molecules on the orientation layer to orient the discotic liquid crystal molecules so that an average inclined angle of discotic planes of the discotic liquid crystal molecules is in the range of 50° to 90° and that an average direction of optical axes of the discotic liquid crystal molecules is essentially parallel to a rubbing direction of the orientation layer:

(I)

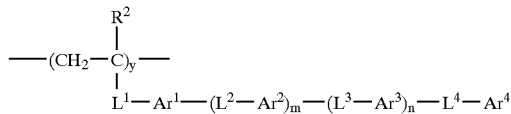
(II)

in which each of $R^1$ and $R^2$ independently is hydrogen, a halogen atom or an alkyl group having 1 to 6 carbon atoms; M is an alkali metal ion; $L^1$ is a divalent linking group selected from the group consisting of —O—, —CO—, —NH—, an alkylene group and a combination thereof; each of $L^2$, $L^3$ and $L^4$ independently is a single bond or a divalent linking group selected from the group consisting of —O—, —CO—, —NH—, —SO$_2$—, an alkylene group, an alkenylene group, an alkynylene group and a combination thereof; each of $Ar^1$, $Ar^2$, $Ar^3$ and $Ar^4$ independently is an aromatic ring, which can have a substituent group; each of m and n independently is 0 or 1; x is 10 to 95 mole %; and y is 5 to 90 mole %.

2. The process as defined in claim 1, wherein at least one of $L^2$, $L^3$ and $L^4$ is a single bond or an alkynylene group.

3. The process as defined in claim 2, wherein at least one of $L^2$, $L^3$ and $L^4$ is ethynylene.

4. The process as defined in claim 1, wherein the discotic liquid crystal molecules have polymerizable groups, and the alignment of the liquid crystal molecules is fixed by polymerization after the liquid crystal molecules are oriented.

5. The process as defined in claim 4, wherein the copolymer has polymerizable groups, and the alignment of the liquid crystal molecules is fixed by polymerization between the liquid crystal molecules and the copolymer after the liquid crystal molecules are oriented.

6. The process as defined in claim 1, wherein the solution containing discotic liquid crystal molecules is coated on the orientation layer to orient all the discotic liquid crystal molecules essentially vertically.

* * * * *